United States Patent
Hande et al.

(10) Patent No.: US 11,679,326 B2
(45) Date of Patent: Jun. 20, 2023

(54) SYSTEMS AND METHOD FOR MODEM POWER AWARE EXTENDED REALITY (XR) AND GAMING SOFTWARE APPLICATIONS

(71) Applicant: QUALCOMM Incorporated, San Diego, CA (US)

(72) Inventors: Prashanth Haridas Hande, San Diego, CA (US); Vinay Melkote Krishnaprasad, Bangalore (IN); Sandeep Kanakapura Lakshmikantha, Bangalore (IN); Ravi Agarwal, San Diego, CA (US); Sabares Moola Sreedaranath, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 17/463,914

(22) Filed: Sep. 1, 2021

(65) Prior Publication Data
US 2023/0068415 A1    Mar. 2, 2023

(51) Int. Cl.
| | | |
|---|---|---|
| *A63F 13/335* | (2014.01) | |
| *H04L 69/168* | (2022.01) | |
| *H04L 41/16* | (2022.01) | |
| *A63F 13/212* | (2014.01) | |
| *H04L 67/131* | (2022.01) | |

(52) U.S. Cl.
CPC .......... *A63F 13/335* (2014.09); *A63F 13/212* (2014.09); *H04L 41/16* (2013.01); *H04L 67/131* (2022.05); *H04L 69/168* (2013.01); *A63F 2300/407* (2013.01); *A63F 2300/646* (2013.01)

(58) Field of Classification Search
CPC ................. A63F 13/335; A63F 13/212; A63F 2300/407; A63F 2300/646; H04L 67/131; H04L 41/16; H04L 69/168
See application file for complete search history.

(56) References Cited

U.S. PATENT DOCUMENTS

| | | | | |
|---|---|---|---|---|
| 7,035,400 B1* | 4/2006 | Gaikwad | ................. | H04L 5/143 |
| | | | | 370/298 |
| 2008/0310485 A1* | 12/2008 | Soliman | ................. | H03M 1/004 |
| | | | | 375/147 |

(Continued)

OTHER PUBLICATIONS

Partial International Search Report—PCT/US2022/035454—ISA/EPO—dated Oct. 4, 2022.

(Continued)

*Primary Examiner* — William H McCulloch, Jr.
*Assistant Examiner* — Ankit B Doshi
(74) *Attorney, Agent, or Firm* — The Marbury Law Group, PLLC

(57) ABSTRACT

Methods and systems for providing software applications on a client device with dynamic control over low-latency mode (LLM) operations of the client device. The client device may monitor downlink data packets of a client software application operating on the client device to detect trigger events. The client device may determine operating parameters of the modem based on a detected trigger event and dynamically adjust the low-latency mode of the modem based on the detect trigger event or the determined operating parameters.

32 Claims, 11 Drawing Sheets

(56) References Cited

U.S. PATENT DOCUMENTS

2020/0014963 A1    1/2020  Gogoi
2021/0258409 A1*   8/2021  Kanamarlapudi .... H04L 1/1896
2021/0281638 A1*   9/2021  Vrcelj ................. H04L 43/0882

OTHER PUBLICATIONS

Futurewei: "XR Applications and Scenarios", 3GPP TSG RAN WG1 Meeting #1 03-e, R1-2007555, 3rd Generation Partnership Project, Mobile Competence Centre, 650, Route Des Lucioles, F-06921 Sophia-Antipolis Cedex, France vol. RAN WG1, No. e-Meeting, Oct. 26, 2020-Nov. 13, 2020, Oct. 23, 2020, 5 Pages, XP051945279, The Whole Document.
International Search Report and Written Opinion—PCT/US2022/035454—ISA/EPO—dated Dec. 12, 2022.
VIVO: "Discussion on Traffic Models of XR", 3GPP TSG RAN WG1 #104-e, R1-2100476, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, 9 Pages, XP051971016, Section 4 Entitled "UL Traffic Model".

* cited by examiner

SYSTEMS AND METHOD FOR MODEM POWER AWARE EXTENDED REALITY (XR) AND GAMING SOFTWARE APPLICATIONS

BACKGROUND

Long Term Evolution (LTE), 5G new radio (NR), and other recently developed communication technologies allow wireless devices to communicate information at data rates (e.g., in terms of Gigabits per second, etc.) that are orders of magnitude greater than what was available just a few years ago. Today's communication networks are also more secure, resilient to multipath fading, allow for lower network traffic latencies, and provide better communication efficiencies (e.g., in terms of bits per second per unit of bandwidth used, etc.). These and other recent improvements in communication technologies have facilitated the emergence of the Internet of Things (IOT), large scale Machine to Machine (M2M) communication systems, vehicles, and other technologies that rely on consistent and secure wireless communications. As a result, billions of small, mobile, or resource constrained computing devices (e.g., smailphones, watches, smart appliances, vehicles, etc.) now use Internet protocol (IP) and cellular communication networks to communicate critical and mundane information.

LTE, 5G NR, and other modern modems may support a low-latency mode (LLM). While operating in an LLM mode, data packets are moved to the next level without accumulation or aggregation. This reduces latency, but increases the amount of power and processing resources used by the device. Some modems support multiple LLM modes with different trade-offs latency, performance, and power and power consumption on the device.

SUMMARY

The various aspects include methods of dynamically adjusting a low-latency mode of a modem in a client device, including receiving, in a data stream management framework, a plurality of inputs related to reception and processing of a downlink data packet stream. The plurality of inputs may include inputs from an application client executing on the computing device and inputs received via a first application programming interface (API) from a modem of the computing device based on monitoring of downlink data packets. The method may further include using the plurality of inputs in the data stream management framework to determine adjustments to one or more modem operating parameters and a modem power estimation to support processing of the downlink data packet stream. In addition, the method may include outputting, from the data stream management framework to the modem via a second API, the determined adjustments to one or more modem operating parameters and the modem power estimation to support processing of the downlink data packet stream.

Some aspects may include using the plurality of inputs in the data stream management framework to determine adjustments to the one or more modem operating parameters and the modem power estimation to support processing of the downlink data packet stream by determining adjustments to one or more of a video bitrate, a video frames per second (FPS) setting, or a low latency modem setting based on one or more of a power estimate, block error rate (BLER), network congestion, or link quality feedback from the modem.

Some aspects may include using the plurality of inputs in the data stream management framework to determine adjustments to the modem operating parameters and the modem power estimation to support processing of the downlink data packet stream by determining adjustments to the one or more modem operating parameters and adjustments to the modem power estimation based on one or more of an input from an application client inferred event API, or an input from an extended modem feedback API.

In some aspects, the input from the extended modem feedback API may include one or more of a modem power estimation, a modem inferred video delay event, a block error rate (BLER), a level of network congestion, or a link quality feedback.

In some aspects, the modem power estimation may be determined based on one or more of an ongoing uplink data rate, an ongoing downlink data rate, an available uplink data rate, an available downlink data rate, or a low-latency mode setting.

In some aspects, the modem inferred video delay event may be determined in the data stream management framework based on at least one or more of a packet header inspection modem event, a transport layer modem event, or a machine learning event.

Some aspects may further include determining the modem inferred video delay event in the data stream management framework based on one or more of a real-time transport protocol (RTP) layer inspecting a packet header and determining all fragments corresponding to a slice that have not arrived in a received packet burst, triggering of a modem low-latency mode (LLM) to release stragglers so that decode may progress, using a RTP timestamp of packets as a reference to infer if any of LLM actions are warranted, comparing RTP timestamps across packets to each other to determine whether a set of packets are late or early resulting in an LLM action, or reading the RTP timestamp of each packet as an absolute RTP timestamp value, determining a local clock offset with respect to source clock, and determining whether a packet is early resulting in an LLM action based on the determined local clock offset and absolute RTP timestamp value.

Some aspects may further include determining the transport layer modem event in the data stream management framework by determining whether there are any pre-programmed time-outs in a transport layer, and implementing a reliable user datagram protocol (RUDP) layer that achieves reliability with a latency constraint in response to determining that there are any pre-programmed time-outs in the transport layer. In some aspects, the RUDP layer may request retransmission of lost packets, the RUDP layer may acknowledge all packets (up to a certain sequence number) that have not arrived at a socket in response to detecting a pre-programmed time-out, and/or the RUDP layer may trigger a low low-latency mode (LLM) prior to detection of the pre-programmed time-out so that any accumulated packets are released right-away.

Some aspects may include determining the machine learning event by implementing, in the data stream management framework, a machine learning based algorithm that learns a cadence of packets over time.

Some aspects may include determining, in the data stream management framework, feedback information for an application server based on the plurality of inputs to support processing of the downlink data packet stream, and providing the feedback information to the application server.

In some aspects, the feedback information provided to the application server may include information that includes or is a function of one or more of modem feedback, feedback from modem on power consumption, feedback from modem that indicates power consumption can be reduced, feedback from modem on link quality, extended modem feedback, extended modem feedback beyond data rate feedback, available data rates for uplink and downlink, application inferred feedback, rate adaptation feedback, power aware video rate adaptation feedback, device temperature feedback, tolerable thermal envelop feedback, video frames per second (FPS) feedback, bitrate feedback to server, and/or rate adaptation feedback.

In some aspects, the data stream management framework may be an application client executing in a processor of the computing device, middleware executing in a processor of the computing device, and/or a software development kit (SDK) implemented in a processor of the computing device.

Some aspects may include performing pose rate adaptation such that there is a one-to-one correspondence between pose samples, application pose samples and pose transmission packets, the pose samples are bundled to generate reduced application pose samples and reduced pose transmission packets, and/or the pose samples are bundled at a lower layer to reduce pose transmission packets.

Some aspects may include adapting a pose rate based on at least one of a measured delay between a user motion and a device display update, an estimate of an amount of motion since collection of a previous pose sample, power consumption feedback received from modem, or feedback on device temperature and closeness to tolerable thermal envelop.

Some aspects may include reducing a pose rate in response to at least one of detecting a higher delay tolerance, detecting a high network throughput that reduces one or more other latencies to offset pose bundling latency, determining that a user is moving slowly or in a highly predictable trajectory, receiving power consumption feedback received from the modem that indicates that power consumption can be reduced, and/or determining a tolerable thermal envelope.

Some aspects may include increasing a pose rate in response to at least one of determining that less delay is required, detecting a consistently high latency, determining that a user is moving fast or in an unpredictable trajectory, receiving power consumption feedback received from modem that indicates no significant increase in power consumption, and/or determining a tolerable thermal envelope.

Some aspects may include adapting a pose rate based on a change in a sampling rate of pose information and/or a change in an amount of pose information being bundled into a single packet for transmission.

Further aspects may include a computing device having a processor configured with processor-executable instructions to perform various operations corresponding to the methods summarized above.

Further aspects may include a non-transitory processor-readable storage medium having stored thereon processor-executable instructions configured to cause a processor to perform various operations corresponding to the method operations summarized above.

Further aspects may include a computing device having various means for performing functions corresponding to the method operations summarized above.

BRIEF DESCRIPTION OF THE DRAWINGS

The accompanying drawings, which are incorporated herein and constitute part of this specification, illustrate example embodiments of the invention, and, together with the general description given above and the detailed description given below, serve to explain features of the invention.

DETAILED DESCRIPTION

Figure 1:
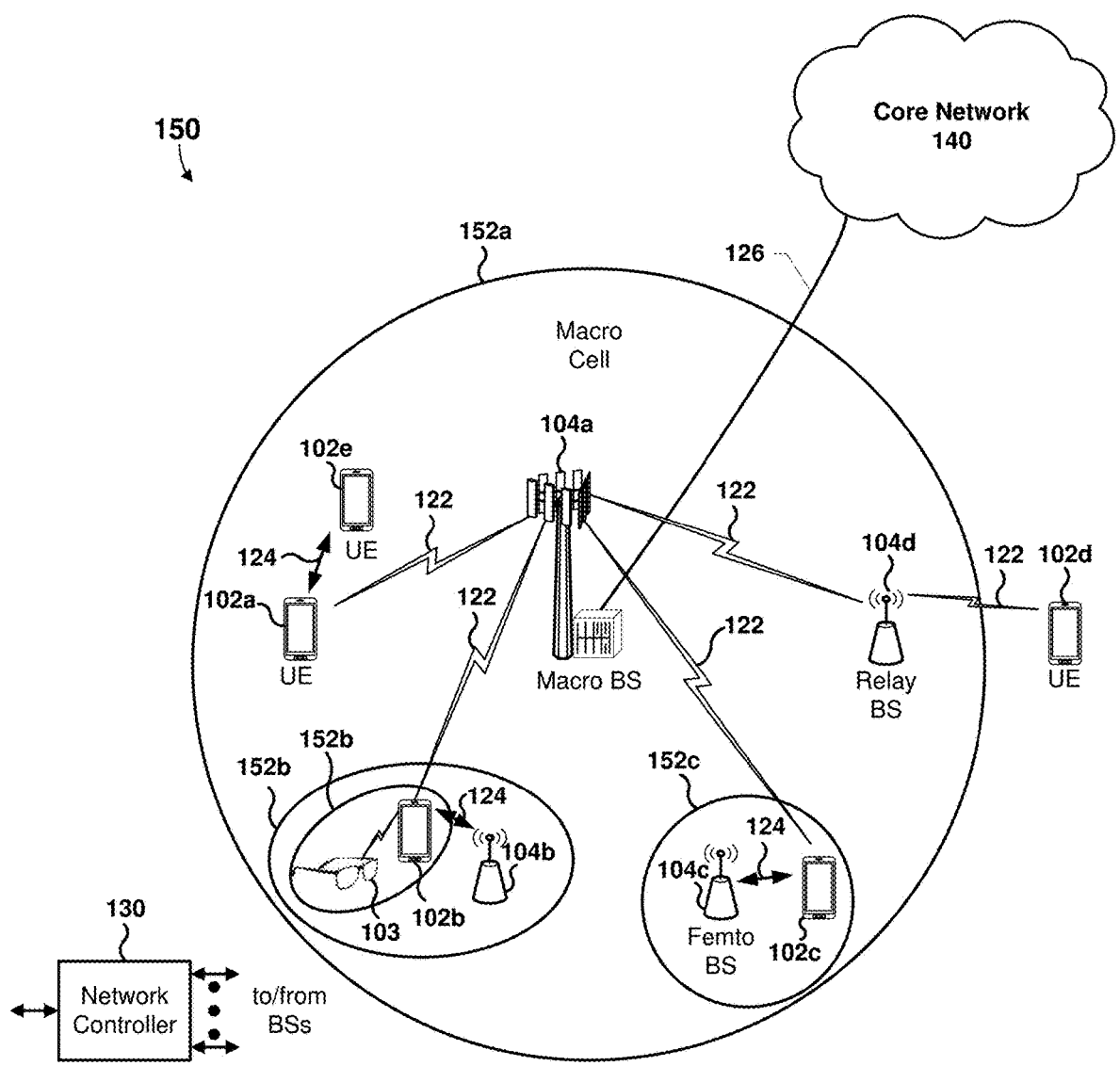
FIG. 1 is communication system block diagrams illustrating network components of example telecommunication systems suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and components (e.g., application clients, 5G modems, client computing devices, etc.) configured to implement the methods, for improving the thermal performance characteristics of a client computing device. Various embodiments include methods, and components (e.g., application clients, 5G modems, client computing devices, etc.) configured to implement the methods, for implementing a data stream management framework for adjusting a low-latency mode of a modem in a client device. Various embodiment may include the data stream management framework receiving a plurality of inputs related to reception and processing of a downlink data packet stream from an application client and from a modem of the computing device, and using the plurality of inputs in the data stream management framework to determine adjustments to one or more modem operating parameters and a modem power estimation to support processing of the downlink data packet stream. Inputs from the modem may be received via a first application programming interface (API). The data stream management framework may output determined adjustments to one or more modem operating parameters and the modem power estimation to the modem via a second API.

In some embodiments, the data stream management framework may be configured to use the plurality of inputs in the data stream management framework to determine adjustments to the one or more modem operating parameters and the modem power estimation to support processing of the downlink data packet stream by determining adjustments to one or more of a video bitrate, a video frames per second (FPS) setting, or a low latency modem setting based on one or more of a power estimate, block error rate (BLER), network congestion, or link quality feedback from the modem.

In some embodiments, the data stream management framework may be configured to use the plurality of inputs in the data stream management framework to determine adjustments to the modem operating parameters and the modem power estimation to support processing of the downlink data packet stream by determining adjustments to the one or more modem operating parameters and adjustments to the modem power estimation based on one or more of an input from an application client inferred event API, or an input from an extended modem feedback API. In some embodiments, the input from the extended modem feedback API received by the data stream management framework may include one or more of: a modem power estimation; a modem inferred video delay event; a block error rate (BLER); a level of network congestion; or a link quality feedback. In some embodiments, the modem power estimation is determined based on one or more of: an ongoing uplink data rate; an ongoing downlink data rate; an available uplink data rate; an available downlink data rate; or a low-latency mode setting.

In some embodiments, the modem may infer inferred video delay event in the data stream management framework based on at least one or more of: a packet header inspection modem event: a transport layer modem event; or a machine learning event. Some embodiments may further include the data stream management framework determining the modem inferred video delay event in the data stream management framework based on one or more of: a real-time transport protocol (RTP) layer inspecting a packet header and determining all fragments corresponding to a slice that have not arrived in a received packet burst; triggering of a modem low-latency mode (LLM) to release stragglers so that decode may progress; using a RTP timestamp of packets as a reference to infer if any of LLM actions are warranted; comparing RTP timestamps across packets to each other to determine whether a set of packets are late or early resulting in an LLM action; or reading the RTP timestamp of each packet as an absolute RTP timestamp value, determining a local clock offset with respect to source clock, and determining whether a packet is early resulting in an LLM action based on the determined local clock offset and absolute RTP timestamp value. Some embodiments may further include the data stream management framework determining the transport layer modem event in the data stream management framework by determining whether there are any pre-programmed time-outs in a transport layer, and implementing a reliable user datagram protocol (RUDP) layer that achieves reliability with a latency constraint in response to determining that there are any pre-programmed time-outs in the transport layer, in which the RUDP layer requests retransmission of lost packets, the RUDP layer acknowledges all packets, up to a certain sequence number, that have not arrived at a socket in response to detecting a pre-programmed time-out, and the RUDP layer triggers a low low-latency mode (LLM) prior to detection of the pre-programmed time-out so that any accumulated packets are released right-away. Some embodiments may further include the data stream management framework determining the machine learning event by implementing a machine learning based algorithm that learns a cadence of packets over time.

In some embodiments, the data stream management framework may further determine feedback information for an application server based on the plurality of inputs to support processing of the downlink data packet stream, and provide the feedback information to the application server. In some embodiments, feedback information provided by the data stream management framework to the application server may include information that includes or is a function of one or more of: modem feedback; feedback from modem on power consumption; feedback from modem that indicates power consumption can be reduced; feedback from modem on link quality; extended modem feedback; extended modem feedback beyond data rate feedback; available data rates for uplink and downlink; application inferred feedback; rate adaptation feedback; power aware video rate adaptation feedback; device temperature feedback; tolerable thermal envelop feedback; video frames per second (FPS) feedback; bitrate feedback to server; or rate adaptation feedback.

In some embodiments, the processor or data stream management framework may be configured to perform pose rate adaption. In some embodiments, such pose rate adaption may be performed so that there is a one-to-one correspondence between pose samples, application pose samples, and pose transmission packets. In some embodiments, such pose rate adaption may be performed so that the pose samples are bundled to generate reduced application pose samples and reduced pose transmission packets. In some embodiments, such pose rate adaption may be performed so that the pose samples are bundled at a lower layer to reduce pose transmission packets.

In some embodiments, the pose rate adaptation operations may include adapting a pose rate based on a measured delay between a user motion and a device display update, an estimate of an amount of motion since collection of a previous pose sample, power consumption feedback received from modem, and/or feedback on device temperature and closeness to tolerable thermal envelope.

In some embodiments, the pose rate adaptation operations may include reducing the pose rate in response to the processor or data stream management framework detecting a higher delay tolerance, detecting a high network throughput that reduces one or more other latencies to offset pose bundling latency, determining that the user is moving slowly or in a highly predictable trajectory, receiving power consumption feedback received from the modem that indicates that power consumption can be reduced, and/or determining a tolerable thermal envelope.

In some embodiments, the pose rate adaptation operations may include increasing a pose rate in response to the processor or data stream management framework determining that less delay is required, detecting a consistently high latency, determining that the user is moving fast or in an unpredictable trajectory, receiving power consumption feedback received from modem that indicates no significant increase in power consumption, and/or determining a tolerable thermal envelope.

In some embodiments, the pose rate adaptation operations may include adapting the pose rate based on a change in a sampling rate of pose information and/or a change in an amount of pose information being bundled into a single packet for transmission.

In various embodiments, the data stream management framework may be one of an application client executing in a processor of the computing device, middleware executing in a processor of the computing device, and/or software development kit (SDK) implemented in a processor of the computing device. A number of different cellular and mobile communication services and standards are available or contemplated in the future, all of which may implement and benefit from various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), and digital enhanced cordless telecommunications (DECT). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The terms "client device" and "client computing device" may be used interchangeably herein, and refer to any one or all of wireless devices, internet-of-things (IOT) devices, cellular telephones, smailphones, personal or mobile multimedia players, personal data assistants (PDA's), laptop computers, tablet computers, ultrabooks, palm-top computers, wireless electronic mail receivers, multimedia Internet enabled cellular telephones, wireless gaming controllers, smart cars, connected vehicles, and similar electronic devices which include a programmable processor, a memory and circuitry for sending and/or receiving wireless communication signals. While various embodiments are particularly useful in wireless devices, such as smailphones and tablets, the embodiments are generally useful in any electronic device that includes communication circuitry for accessing wireless Internet Protocol (IP) and data services through cellular and wireless communication networks.

The term "application client" may be used herein to refer to a software application (e.g., XR application, cloud gaming software, etc.), software development kit (SDK), middleware, firmware, thread, process or any similar component included in, or operating on, the client computing device.

The term "feedback data" may be used herein to refer to any or all information that is collected, generated, or inferred based on the activities, operations, events, or conditions detected in a modem, and may include any or all of current or predicted power consumption estimates, modem operating modes, block error rates (BLER), network congestion information, bitrate or periodicity of the traffic, uplink and downlink data rates, link quality information, latency estimates, indication of the available data rates or available bandwidth, potential increases or decreases in data rates and the corresponding changes in the power consumption, or other similar factors, conditions, parameters or values.

The term "IP Accelerator (IPA)" is used herein to a hardware block within a modem of a client device. The IPA may be configured to execute datapath functions and/or to allow the client device to perform certain network functions (e.g., routing, filtering, network address translation, aggregation, etc.) without the active involvement of the client device's main application processor (AP). A datapath may be a path between an application layer component (e.g., client software application, etc.) and the modem. Datapath functions may be performed on the uplink and downlink bits within the application layer and/or the modem's packet data convergence protocol (PDCP) layer.

The term "system on chip (SOC)" is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package (SIP)" may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

Communications networks experience network fluctuations (e.g., changes in the availability of resources, etc.) that cause the status of the network to change over time. These fluctuations may cause a client device to drop packets, under-run buffers, or otherwise negatively impact the user experience. Adaptive bitrate streaming technologies allow software applications on the client device to respond to such changes in network conditions by adjusting the bitrate or quality of the streams that are transmitted to or received by the client device. As an example, these technologies may include an application server that reads in a raw video file and generates multiple versions of the file (sometimes called "representations") for delivery over an Internet Protocol (IP) network. The client device may dynamically choose which representations to receive from the application server based on resource availability or other suitable factors.

Components and circuitry (e.g., 5G modems, etc.) within the client device generate heat or thermal energy, which at excessive levels could have a significant negative impact on the performance and functioning of the device. The amount of thermal energy that is generated may depend upon the components included in the client device, the device's operating conditions, and/or the operations or activities in the device. For example, processors and other components in the client device generate a significant amount thermal energy when the performing complex tasks, such as video processing. As another example, a client device that wirelessly receives or transmits data for a sustained time period at a high power-level may generate a large amount of thermal energy, which could have a significant negative impact on the performance and functioning of the client device. The thermal energy could also damage or shorten the operating life of the client device.

Modern client devices may be equipped with heat dissipating structures that help ensure the device does not over-heat (e.g., operate at unsafe temperatures that damage or shorten the operating life of the device, etc.). Device manufacturers often build devices that are either large enough to include significant heat dissipating structures or build smaller but less powerful devices that attempt to balance tradeoffs between performance and power consumption. That is, since smaller devices include a reduced overall surface area and/or form factor (e.g., size, shape, appearance, etc.), they also include fewer or smaller heat dissipating structures (heatsinks). These reductions in surface area or form factor could have a significant negative impact on the device's power dissipation and/or thermal performance characteristics.

Generally, a client device receives data from an application server at a regular cadence. The modem of the client device holds the data it receives (i.e., for accumulation, heuristics, aggregation, etc.) for a small amount of time before sending the data to a client software application. While this delay is tolerable for most client software applications, it could be problematic for certain software applications, such as extended reality (XR) and Cloud gaming software applications, whose performance may be negatively impacted by delayed data receipts (latency).

A modem may include multiple operating modes, including one or more low-latency modes (LLM) in which packets are moved to the next level in the protocol or processing stack without performing accumulation or aggregation operations. A modem may also include features that allow client software applications operating on the device and receiving the data packets to select and set the low-latency mode for the device or application. While such low-latency modes reduce latency, they may require/consume additional processing resources and/or increase power consumption on the device. For example, a low latency operating mode may require that modem operate at a higher frequency to process tasks faster (e.g., as measured in millions of instructions per second (MIPS), etc.), which may drain a mobile device's battery or increase the power consumption characteristics of the client device. To better balance tradeoffs between latency, performance and power consumption, some modems allow the client software applications to select one of multiple different low-latency modes, each of which strikes a different balance and/or implements a different trade-off point between latency, performance and power consumption.

Some embodiments may reduce or minimize power consumption on the client device by coordinating and controlling the activities of an application client (e.g., software development kit (SDK), software application, firmware, middleware, etc.) and the modem on a client device. The software applications and modem may communicate using feedback application programming interfaces (APIs) and action APIs. For example, a software application may use feedback APIs to collect information (feedback) from the modem, and action APIs to send information (e.g., commands, control instructions, etc.) to the modem.

The software application client may also use the feedback APIs send inferred or collected data from the modem (feedback) to an application server. The feedback may be used to modulate the data (e.g., video frames) transmitted by the application server towards the client device. For example, the software application client may use the feedback APIs to collect information from the modem, use the collected information to determine the modem's available bandwidth or available data rates (i.e., up to what uplink bitrate can the modem support, etc.) for uplink and/or downlink communications, perform bitrate adaptation based on the data rates, and send the corresponding modem feedback (e.g., available data rates, bitrate adaptations, etc.) to an application server and/or application cloud.

In some embodiments, the software application client may infer the modem feedback at the application level. For example, the software application may deduce, conclude or estimate the modem's available data rates based on estimates for network bandwidth, latency, etc. As another example, the software application may infer that the network is stalling based on information collected from buffers used by the modem to receive and move packets. That is, if a buffer that is used to receive data is shirking or becoming empty, the software application may infer that the device is moving packets to the next level in the protocol or processing stack faster than it receives them, and thus the network is congested or becoming stalled. The software application may use the action APIs to send information to the modem.

Using conventional solutions, a client device or modem that enters a low-latency mode will continue to operate in that mode regardless of whether packets are delayed, regardless of whether the modem continues to strike a suitable balance between latency, performance and power consumption, and/or regardless whether the low-latency mode operations continue to be effective or beneficial. This may cause an unnecessary power drain in the client device. For example, the impact on the user experience of data packet latency may vary significantly throughout game play (e.g., explosions require low-latency, while near static scenes do not). As such, a gaming application that selects a particular a low latency mode may strike correct balance between latency and power consumption for some tasks (e.g., explosions in gameplay, etc.), waste the device's processing or battery resources for other tasks (e.g., rendering near static scenes, etc.).

Some embodiments may overcome some of the limitations of conventional solutions by configuring the modem (e.g., a 5G modem) to enable application-based dynamic configuration of its IPA and datapath parameters to dynamically implement or adjust the low-latency mode based on a variety of application conditions. As such, a modem configured in accordance with the embodiments may deliver packets with low latency for some task or in some portions of the execution of the application (e.g., when gameplay is fast or an action requires a large data download, etc.) and deliver packets power-efficiently for other tasks or in other portions of the execution of the application (e.g., in static or slower moving portions of the gameplay, etc.).

The modem may be configured to allow a client software application (i.e., the app using the data) to use application layer or transport layer triggers (e.g., real-time transport protocol layer trigger events, etc.) to determine whether to enter into a low latency mode and/or to determine operating parameters that balance tradeoffs between latency, performance and power consumption on the device. For example, the client software application may use trigger events to determine whether downlink data packets should be delivered faster at a higher power consumption, whether downlink data packets may be subjected to the IPA and datapath aggregation/accumulation on the modem to reduce power consumption on the client device, and/or whether a static condition exist that allows the data packets to be aggregated for an even greater reduction in power consumption on the client device.

In response to the client software application determining that downlink data packets should be delivered faster at a higher power consumption, the client software application may invoke a packet "flush" frequently or using a fast time scale (e.g. every 1-100 milliseconds, etc.). Only the packets that are indicated by the client software application are moved to the next level in the protocol or processing stack without performing accumulation or aggregation operations. All other packets are accumulated or aggregated so as to reduce power consumption on the device.

In response to the client software application determining that downlink data packets may be subjected to the IPA and datapath aggregation/accumulation on the modem, or in response to determining that the packets may be delivered less frequently or on a slower time scale (e.g. every 100 ms, 1 second, 3 seconds, etc.), the client software application may toggle between different low latency modes with different latencies based on how late or early past packets have been received.

In response to the client software application determining that a static condition exist that allows the data packets to be aggregated or that the current conditions are nearly static (e.g., a pause in the action or near still imagery for several seconds or minutes, etc.), the client software application may configure a frame or slice timeout associated with an event (e.g., first packet rx, last packet rx) at the modem. In response, the modem may aggregate packets of the frame (or slice). The modem may start a timer in response to determining that the event occurred. Upon detecting a timeout or expiration of the timer, the client software application may invoke a packet "flush" so that the packets are flushed to the application layer and/or so that the packets are accumulated/aggregated so as to improve the power consumption characteristics of the client device.

In some embodiments, the client software application may be configured to dynamically determine operating parameters, dynamically select a low-latency mode, and/or dynamically control low-latency mode operations so as to balance tradeoffs between meeting immediate latency needs of the client software application and reducing power consumption on the client device.

In various embodiments, the client software application may be configured to use detected application layer or transport layer trigger events to determine operating parameters (i.e., values that strike the correct balance between latency, performance and power consumption on the device). A trigger may be an event driven procedure, message or information structure that includes a trigger definition. A trigger definition may identify or define one or more trigger events. The term "trigger events" is used herein to refer to events or conditions defined in a trigger definition to cause the client device to perform low latency mode (LLM) related actions. In particular, in response to detecting a trigger event, the client device may determine operating parameters of the modem based on a detected trigger event, and then dynamically adjust the low-latency mode of the modem based on the determined operating parameters. None-limiting examples of trigger events include a transport layer time out, detecting that not all fragments corresponding to a slice arrived within a data burst, determining that packets arrived earlier or later than expected, detecting a short/outage in a download service, detecting that not all fragments corresponding to a slice have been received or not included within a received data burst, detecting a short/outage in the download service, detecting controller event such as a button press event, and the like. The trigger definition may also include a payload or contents of the trigger event (e.g., a software application procedure, etc.), information that identifies a destination to which the payload/content is to be sent, and/or trigger type information.

In some embodiments, the client software application may be configured to dynamically select a low-latency mode and/or dynamically control low-latency mode operations based on trigger events/conditions, which may include the client device detecting trigger events such as a transport layer time out, determining that not all fragments corresponding to a slice arrived within a data burst, determining that packets arrived earlier or later than expected, detecting a short/outage in a download service, and/or based on the nature of controller events or their mappings.

In some embodiment, the trigger event/condition may be based on a transport layer time out. The client software application may use a transport layer sub-module or sub-layer, such as a Reliable-User Datagram Protocol (RUDP) transport layer, to comply with strict reliability and latency constraints. The RUDP layer component generally requests retransmission of lost packets. On a pre-programmed time-out, the RUDP layer component may acknowledge any or all packets (e.g., up to a certain sequence number, etc.) that have not yet arrived at the socket. Prior to such a time-out, the RUDP layer component may determine or select a low latency mode that immediately releases packets that have accumulated in the IPA. That is, packets that have accumulated in the IPA are not marked lost (from the socket's point of view), which may improve the latency characteristics of the client device and/or client software application.

In some embodiment, the trigger event may be based on a determination in the real-time transport protocol (RTP) layer that not all fragments corresponding to a slice have arrived within a data burst. That is, RTP layer components may be configured to inspect packet headers and determine whether all fragments corresponding to a slice were included within a received data burst. In response to the trigger event of determining that all fragments corresponding to a slice have not yet arrived or where not include within a received data burst, the client device may determine or select a low latency mode that immediately releases the stragglers (i.e., the slice fragments that have not yet arrived) so that the client device may commence performing data decoding operations. This may improve the latency characteristics of the client device and/or client software application.

In some embodiment, the trigger event/condition may be based on whether packets are early or late. For example, the client device may compare RTP timestamps of the packets to determine whether packets are early or late, and dynamically implement or adjust the low-latency mode based on whether packets are received early or late. In some embodiments, the client device may be configured to read the RTP timestamp of each packet as an absolute value. If the local clock offset with respect to source clock is known, the client device may determine whether the packet is early based on the absolute RTP timestamp of that packet. The client device may implement or adjust the low-latency mode based on whether packets are received early and/or to improve the latency characteristics of the client device and/or client software application.

In some embodiment, the trigger event/condition may be based on whether there has been a short/outage in the download service. A short/outage in the download service may indicate to the client device that a burst of accumulated packets may soon arrive. As such, in response to detecting a short/outage in the download service, the client device or client software application may trigger the low-latency mode to move to the next I-frame in the sequence to stem error-propagation. The client device may continue to trigger (or continue to operate in) the low latency mode until the I-frame is received.

In some embodiment, the trigger event/condition may be based on the nature of controller events and/or their mappings. The client device or client software application may trigger the low-latency mode in response to the client software application detecting button presses (which are controller events) so that an action associated with the button press event (e.g., simulated gun shots in a gaming app, etc.) may can be received, processed, presented or rendered with low latency.

In some embodiments, the client computing device may be configured to dynamically adjust the low-latency mode (LLM) of the device. For example, client device may monitor downlink data packets of a client software application operating on the client device to detect trigger events, determine operating parameters of the modem based on a detected trigger event, and dynamically adjust the low-latency mode of the modem based on the determined operating parameters and/or based on the detected trigger event.

Trigger events may include the client device detecting a transport layer time out, the client device determining that not all fragments corresponding to a slice arrived within a data burst, the client device determining that packets arrived earlier or later than expected, the client device detecting a short/outage in a download service, and/or based on the presence, the client device detection or nature of controller events or their mappings.

In some embodiments, the client computing device may determine operating parameters that balance tradeoffs between latency, performance and power consumption on the device. In some embodiments, the client software application may use the triggers to determine whether downlink data packets should be delivered faster at a higher power consumption, whether downlink data packets may be subjected to the IPA and data path aggregation/accumulation on the modem to reduce power consumption on the client device, and/or whether a static condition exist that allows the data packets to be aggregated for an even greater reduction in power consumption on the client device.

In some embodiments, the client computing device may invoke a packet flush at a fast time scale so that downlink data packets identified by the client software application are moved to a next level in a protocol or processing stack of the modem without performing accumulation or aggregation operations to reduce latency on the client device, and perform the accumulation or aggregation operations on the remaining downlink data packets to reduce power consumption on the client device. In some embodiments, the client computing device may toggle between different low latency modes with different latencies based on the operation conditions of the device (or the current tasks performed by the client software application) so as to balance tradeoffs between latency, performance and power consumption on the device.

In some embodiments, the client computing device may invoke a packet flush at a fast time scale so that downlink data packets identified by the client software application are moved to a next level in a protocol or processing stack of the modem without performing accumulation or aggregation operations to reduce latency on the client device.

In some embodiments, the client computing device may perform accumulation and/or aggregation operations on the remaining downlink data packets to reduce power consumption on the client device.

In some embodiments, the client computing device may evaluate timestamps of previously received data packets to determine whether the previously received data packets arrived early or late. The client computing device may toggle between different low latency modes with different latencies based on whether the previously received data packets arrived early or late.

In some embodiments, the client computing device may monitor downlink data packets to determine whether a condition of the client software application is static (or near-static). The client computing device may set a timer in response to determining that the condition of the client software application is static or near-static, and commence aggregating and/or accumulating downlink data packets in the modem until the timer expires. After the timer expires, the client device processor may invoke a packet flush that sends downlink data packets to a next level in a protocol or processing stack of the modem without performing accumulation or aggregation operations.

FIG. 1 illustrates an example of a communications system 150 that is suitable for implementing various implementations. The communications system 150 may be a 5G NR network, or any other suitable network such as an LTE network.

The communications system 150 may include a heterogeneous network architecture that includes a communication network 140 and a variety of client devices (illustrated as client device 102a-102e in FIG. 1). The communications system 150 also may include a number of base stations (illustrated as the BS 104a, the BS 104b, the BS 104c, and the BS 104d) and other network entities. A base station is an entity that communicates with client devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. For ease of reference, the term "base station" is used herein to refer to any of a range of communication nodes in wireless communication networks including for example an eNB, NR BS, gNB, TRP, AP, node B, 5G NB, Customer Premises Equipment (CPE), an integrated access backhaul (IAB) node and other communication nodes that establish a wireless communication "cell."

A base station 104a-104d may provide communication coverage for a macro cell, a pico cell, a femto cell, another type of cell, or a combination thereof. A macro cell may cover a relatively large geographic area (for example, several kilometers in radius) and may allow unrestricted access by client devices with service subscription. A pico cell may cover a relatively small geographic area and may allow unrestricted access by client devices with service subscription. A femto cell may cover a relatively small geographic area (for example, a home) and may allow restricted access by client devices having association with the femto cell (for example, client devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 104a may be a macro BS for a macro cell 152a, a base station 104b may be a pico BS for a pico cell 152b, and a base station 104c may be a femto BS for a femto cell 152c. A base station 104a-104d may support one or multiple (for example, three) cells.

In some examples, a cell may not be stationary, and the geographic area of the cell may move according to the location of a mobile base station. In some examples, the base stations 104*a*-104*d* may be interconnected to one another as well as to one or more other base stations or network nodes (not illustrated) in the communications system 150 through various types of backhaul interfaces, such as a direct physical connection, a virtual network, or a combination thereof using any suitable transport network.

The communications system 150 also may include relay stations (such as relay BS 104*d*). A relay station is an entity that can receive a transmission of data from an upstream station (for example, a base station or a client device) and send a transmission of the data to a downstream station (for example, a client device or a base station). A relay station also may be a client device that can relay transmissions for other client devices. In the example illustrated in FIG. 1, a relay station 104*d* may communicate with the macro base station 104*a* and the client device 102*d* in order to facilitate communication between the macro base station 104*a* and the client device 102*d*. A relay station also may be referred to as a relay base station, a relay, etc.

The communications system 150 may be a heterogeneous network that includes base stations of different types, for example, macro base stations, pico base stations, femto base stations, relay base stations, etc. These different types of base stations may have different transmit power levels, different coverage areas, and different impacts on interference in communications system 150. For example, macro base stations may have a high transmit power level (for example, 5 to 40 Watts), whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The client devices 102*a*, 102*b*, 102*c* may be dispersed throughout communications system 150, and each client device may be stationary or mobile. A client device also may be referred to as an access terminal, a terminal, a mobile station, a subscriber unit, a station, etc. A client device 102*a*, 102*b*, 102*c* may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices 103 (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

A macro base station 104*a* may communicate with the communication network 140 over a wired or wireless communication link 126. The client devices 102*a*, 102*b*, 102*c* may communicate with a base station 104*a*-104*d* over wireless communication links 122.

Wired communication links 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

Wireless communication links 122, 124 may include a plurality of carrier signals, frequencies, or frequency bands, each of which may include a plurality of logical channels. The wireless communication links may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 150 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may depend on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a subcarrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per client device. Multi-layer transmissions with up to two streams per client device may be supported. Aggregation of multiple cells may be supported with up to eight serving cells. Alternatively, NR may support a different air interface, other than an OFDM-based air interface.

Some client devices may be considered machine-type communication (MTC) or evolved or enhanced machine-type communication (eMTC) client devices. MTC and eMTC client devices include, for example, robots, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some client devices may be considered Internet-of-Things (IoT) devices or may be implemented as NB-IoT (narrowband internet of things) devices. The client device 102a-102e may be included inside a housing that houses components of the client device 102a-102e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Access to the air interface may be scheduled, where a scheduling entity (for example, a base station) allocates resources for communication among some or all devices and equipment within the scheduling entity's service area or cell. The scheduling entity may be responsible for scheduling, assigning, reconfiguring, and releasing resources for one or more subordinate entities. That is, for scheduled communication, subordinate entities utilize resources allocated by the scheduling entity.

In some implementations, two or more client devices 102a-102e (for example, illustrated as the client device 102a and the client device 102e) may communicate directly using one or more sidelink channels 124 (for example, without using a base station 104a-d as an intermediary to communicate with one another). For example, the client devices 102a-102e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the client device 102a-102e may perform scheduling operations, resource selection operations, as well as other operations described elsewhere herein as being performed by the base station 104a-d.

To establish communication with a base station 104a-d, a client device 102a-102e may attempt to acquire SI from the base station 104a-d. SI may be provided in one or more system information blocks, such a Master Information Block (MIB) and one or more System Information Blocks (SIBs). SI provides timing and structure information that enables the client device 102a-102e to receive and decode further information from the base station 104a-d that enables the client device 102a-102e for example, to access communications through the base station 104a-d, cell access, to perform cell reselection, intra-frequency, inter-frequency and inter-RAT cell selection procedures, and other operations.

In 5G NR, certain system information, such as the MIB and a SIB1 message, are broadcast by a base station. In some implementations, additional SI may be broadcast as well. However, in some implementations, the additional SI (such as on-demand SI) may be transmitted by the base station in response to a request for the additional SI (such as a request for the on-demand SI). In some implementations, the broadcast SI (that is, the MIB or SIB1 messages) may include scheduling information to enable the client device 102a-102e to request and receive the on-demand system information.

When a client device 102a-102e is powered on, the client device 102a-102e may perform a cell search and acquire one or more synchronization signals (such as a Primary Synchronization Signal (PSS) and a Secondary Synchronization Signal (SSS)) and a Physical Broadcast Channel (PBCH) from a base station 104a-d. Using the synchronization signal(s) and information from the PBCH the client device 102a-102e may receive, decode and store MIB message(s) from the base station 104a-d. Using parameters from the decoded MIB, the client device 102a-102e may receive and decode the SIB1 message. In some implementations, the SIB1 message may indicate that the base station 104a-d is configured to provide one or more on-demand SI messages. To acquire the on-demand SI messages, the client device 102a-102e may send a request to the base station 104a-d for the one or more on-demand SI messages. In some implementations, sending the request for the one or more on-demand messages may be part of a Random Access Channel (RACH) request procedure.

Figure 2:
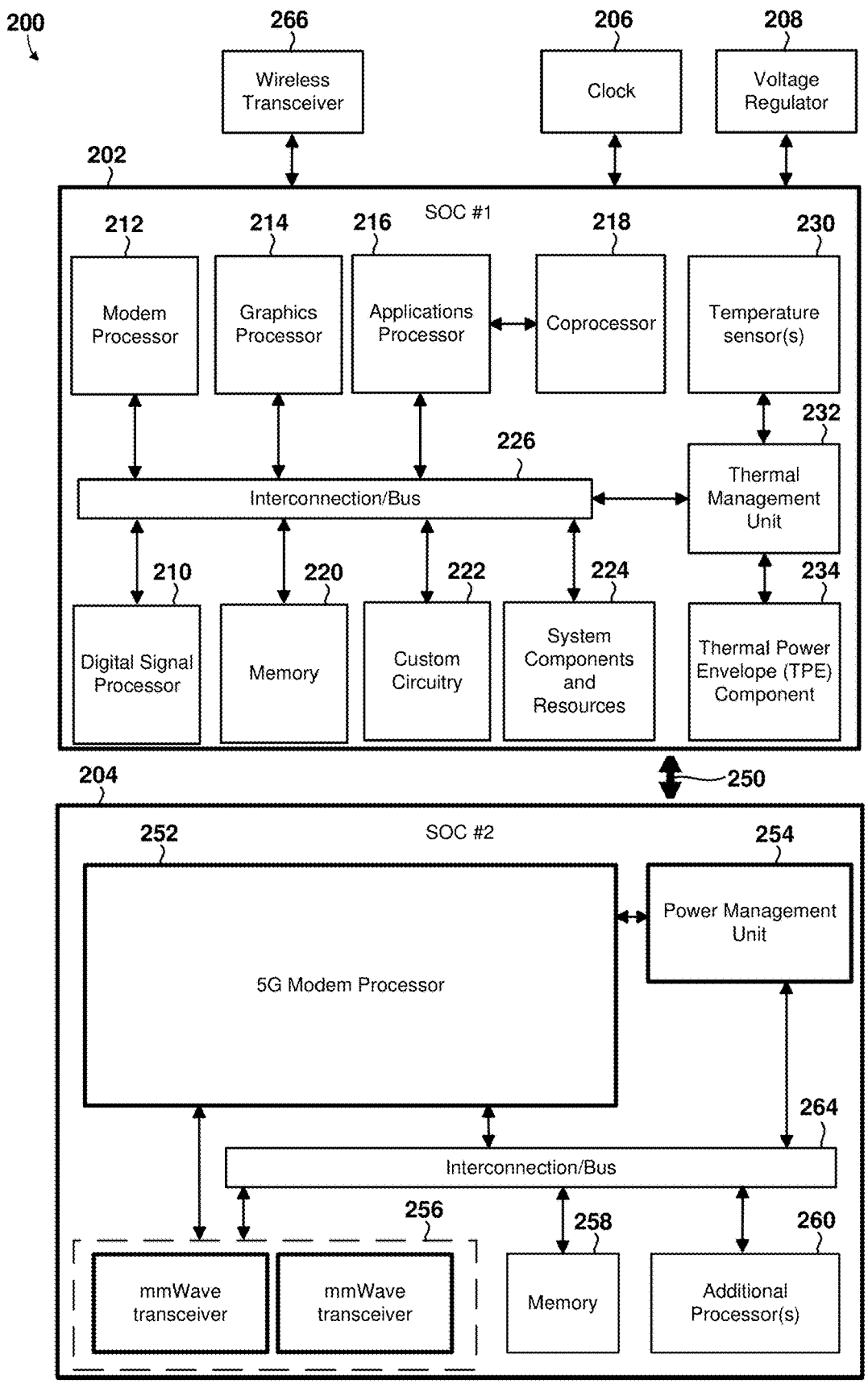
FIG. 2 is a component block diagram illustrating an example client computing device that could be configured with an extended application programming interfaces (APIs) in accordance with some embodiments to reduce power consumption on the client computing device.

FIG. 2 illustrates an example computing system or SIP 200 architecture that may be used in client devices implementing the various implementations.

With reference to FIGS. 1 and 2, the illustrated example SIP 200 includes a two SOCs 202, 204, a clock 206, a voltage regulator 208, and a wireless transceiver 266 configured to send and receive wireless communications via an antenna (not shown) to/from client devices, such as a base station 104a. In some implementations, the first SOC 202 operates as central processing unit (CPU) of the client device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wavelength (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a client device. The system components and resources 224 or custom circuitry 222 also may include circuitry to interface with peripheral devices, such as cameras, electronic displays, wireless communication devices, external memory chips, etc.

The first and second SOC 202, 204 may communicate via an interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
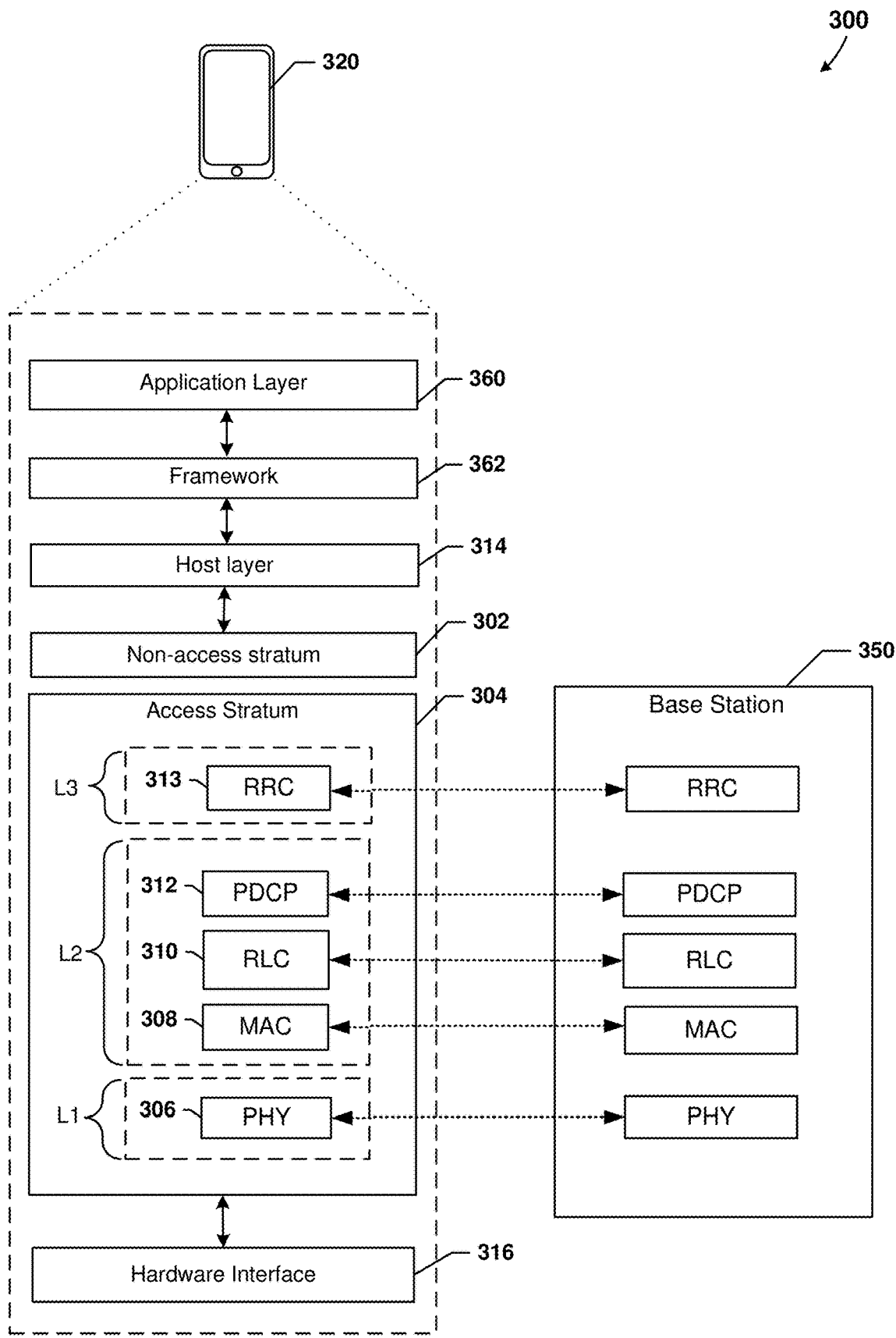
FIG. 3 is a component block diagram of an example software architecture including a radio protocol stack for the user and control planes in wireless communications.

FIG. 3 illustrates an example of a software architecture 300 including a radio protocol stack for the user and control planes in wireless communications between a base station 350 (such as the base station 104a) and a client device 320 (such as the client devices 102a-102e, 200). With reference to FIGS. 1-3, the client device 320 may implement the software architecture 300 to communicate with the base station 350 of a communication system (such as 100). In various implementations, layers in software architecture 300 may form logical connections with corresponding layers in software of the base station 350. The software architecture 300 may be distributed among one or more processors (such as the processors 212, 214, 216, 218, 252, 260). While illustrated with respect to one radio protocol stack, in a multi-SIM (subscriber identity module) client device, the software architecture 300 may include multiple protocol stacks, each of which may be associated with a different subscriber identity module (SIM) (such as two protocol stacks associated with two SIMs, respectively, in a dual-SIM wireless communication device). While described below with reference to LTE communication layers, the software architecture 300 may support any of variety of standards and protocols for wireless communications, or may include additional protocol stacks that support any of variety of standards and protocols wireless communications.

The software architecture 300 may include an application layer 360, framework 362 (e.g., a data stream management framework, etc.), host layer 314, Non-Access Stratum (NAS) 302 and an Access Stratum (AS) 304. The NAS 302 may include functions and protocols to support packet filtering, security management, mobility control, session management, and traffic and signaling between a SIM(s) of the client device (such as SIM(s) 204) and its core network. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the client device 320 and the base station 350 over the physical layer 306. In the various implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various implementations, the RRC sublayer 313 may provide functions including broadcasting system information, paging, and establishing and releasing an RRC signaling connection between the client device 320 and the base station 350.

In various implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the client device 320. In some implementations, application-specific functions provided by the at least one host layer 314 may provide an interface between the software architecture and the general purpose processor 206.

In other implementations, the software architecture 300 may include one or more higher logical layers (such as transport, session, presentation, application, etc.) that provide host layer functions. For example, in some implementations, the software architecture 300 may include a network layer (such as IP layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency transceivers).

In some embodiments, the protocol stack of the client device may include a physical layer module, a data link layer module, a network layer module, a transport layer module, and an application layer module, each of which may be implemented in hardware, in software, or in a combination of hardware and software. Further, each of these may include sub-layers, which may also be implemented in hardware, in software, or in a combination of hardware and software.

The physical layer module may include radio components configured to receive the basic communication signal, extract data from the communication signal, and provide the data to a media transport stream (e.g., MPEG-2 Transport Stream) or a media access control module in the data link layer module. The data link layer module may provide addressing and channel access control mechanisms that make it possible for various components of the client device to receive the different streams of data. The data link layer module may also include various sub-modules or sub-layers for carrying a packet protocol (e.g., Internet Protocol) on top of a Moving Picture Experts Group (MPEG) transport stream (TS), such as a multiprotocol encapsulation forward error correction (MPE-FEC) module/layer and a program and system information (SI/PSI) module/layer.

Portions of the stream/signal carrying the content and information flows may be passed by the data link layer module to the network layer module, which may include an IP module/interface for communicating/relaying streams, datagrams and/or packets to the transport layer module. Streams and data received in the transport layer module may be delivered to the appropriate transport layer sub-modules or sub-layers, which process and package the data for transport. Such transport layer sub-modules/sub-layers may include a user datagram protocol (UDP) module/layer, an asynchronous layered coding/layered coding transport (ALC/LCT) module/layer, a real-time transport protocol (RTP) module/layer, and a file delivery over unidirectional transport (FLUTE) module/layer. In an embodiment, the RTP module/layer may be included in or as part of the application layer, similar to Dynamic Adaptive Streaming over Hyper Text Transport Protocol (HTTP) (DASH) formats.

The application layer module may include protocols and methods required to establish host-to-host, end-to-end connections and to conduct process-to-process communications. The application layer module may also include end-user applications (e.g., media player, etc.) for processing, rendering and/or displaying the received content on the mobile receiver device. The application layer may also include media formats, such as Dynamic Adaptive Streaming over HTTP (DASH) formats, encoded media streams and other media related metadata, an RTP module, and a media player module.

Figure 4:
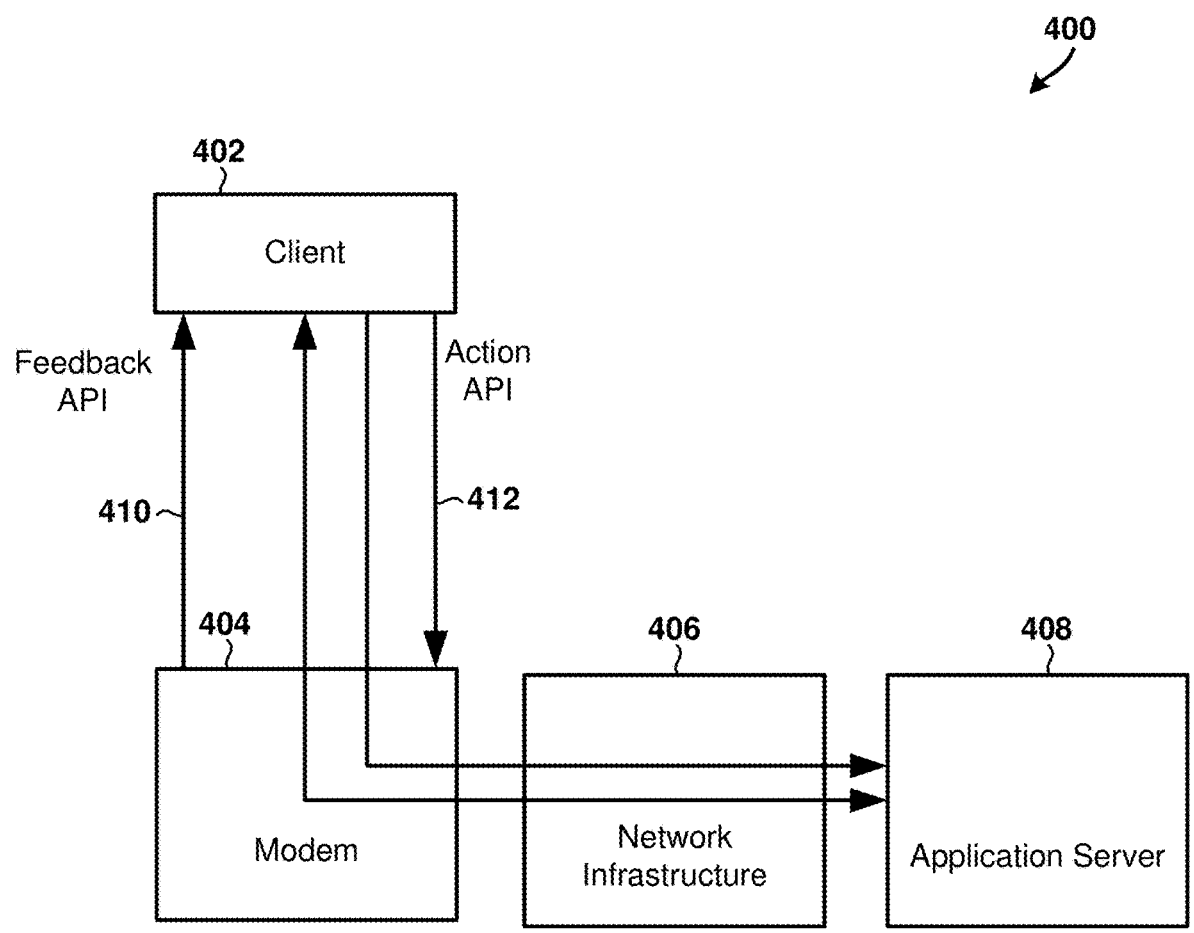
FIG. 4 is a component block diagram of an example client computing device that could be configured in accordance with some embodiments to reduce its power consumption and/or improve its thermal performance characteristics.

FIG. 4 illustrates a system 400 suitable for implementing the various embodiments. In the example illustrated in FIG. 4, the system 400 includes a client application 402, modem 404, network infrastructure 406, and application server 408. The client application 402 may communicate with the modem via a feedback API 410 and/or an action API 412. The client application 402 may communicate with the application server 408 through the modem 404 and network infrastructure 406.

Figure 5:
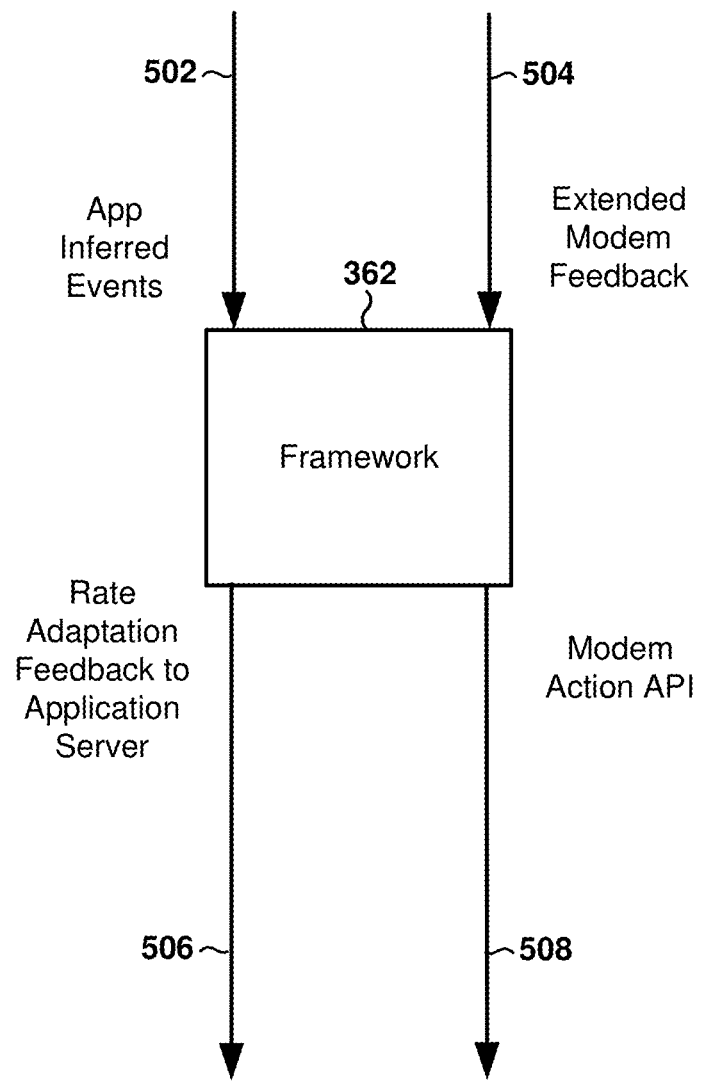
FIG. 5 is a block diagram illustrating an example framework component that could be included in a client computing device configured in accordance with some embodiments.

FIG. 5 illustrates a framework 362 component that could be configured to intelligently and dynamically adjusting a low-latency mode of a modem in a computing device in accordance with some embodiments. In some embodiments, the framework 362 may be included as part of a software system (e.g., software architecture 300 illustrated in FIG. 3) included in a client device. In the example illustrated in FIG. 5, the framework 362 receives application inferred events 502 and extended modem feedback 504. The framework 362 may output rate adaptation feedback 506 to the application server (e.g., application server 408 illustrated in FIG. 4). The framework 362 may also output a modem action API 508 (e.g., to the modem 404 illustrated in FIG. 4).

Figure 6:
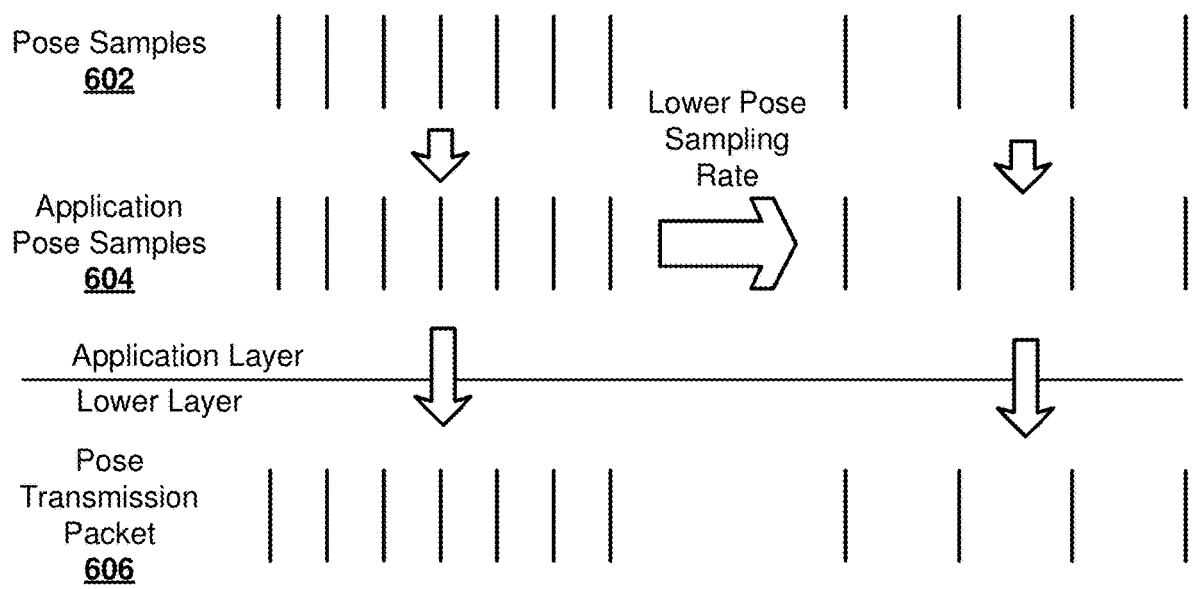
FIG. 6-8 are block diagrams illustrating methods of adjusting a pose rate to stay within a power budget in accordance with some embodiments.
Figure 7:
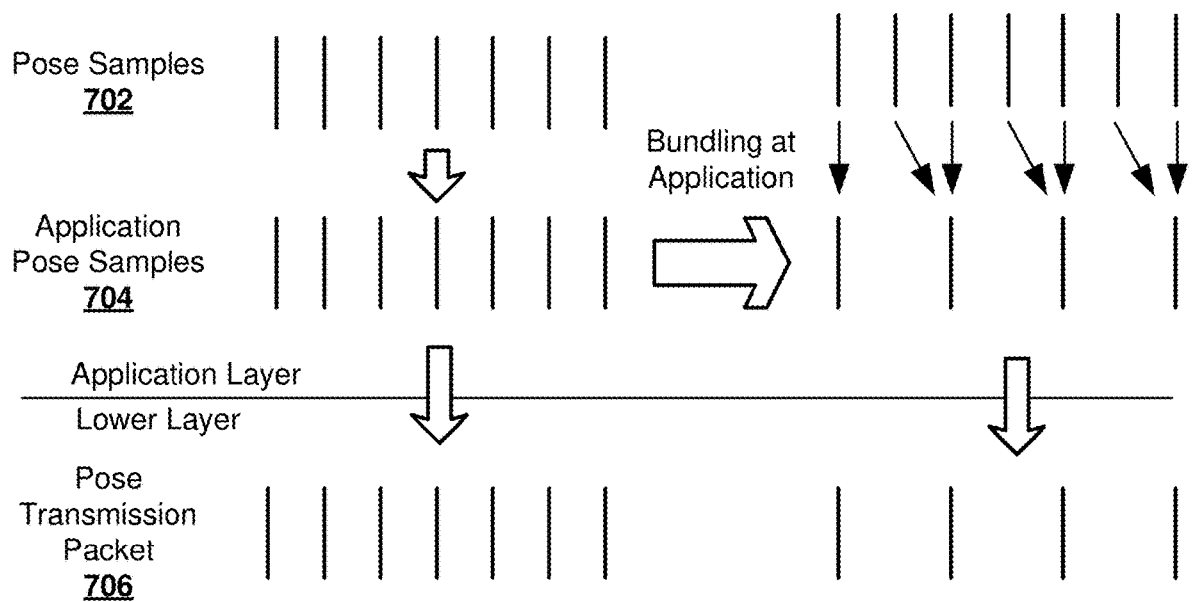
Figure 8:
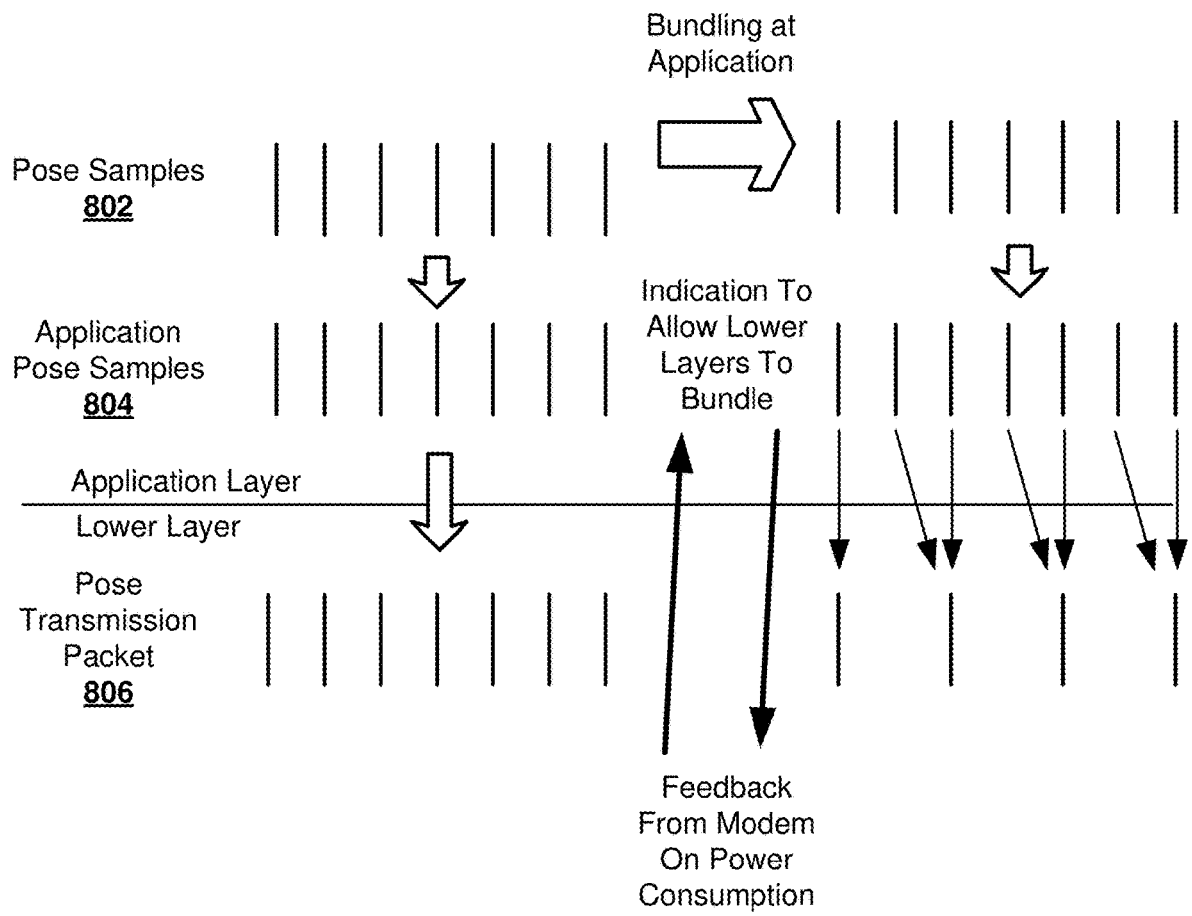

FIGS. 6-8 illustrate various rate adaptation operations that could be performed by a computing device (or framework 362, etc.) configured in accordance with the embodiments. In the example illustrated in FIG. 6, there is a one-to-one correspondence or ratio between the pose samples 602, the application pose samples 604 and pose transmission packets 606. That is, the lowing the pose sampling rate reduces the application pose samples 604 and pose transmission packets 606.

In the example illustrated in FIG. 7, the system bundles the pose samples 702 at the application layer. That is, the pose samples 702 are not reduced, but bundled to generate reduced application pose samples 704 and reduced pose transmission packets 706.

In the example illustrated in FIG. 8, the system bundles the pose samples 802 at the lower layer. That is, neither the pose samples 802 nor the application pose samples 804 are reduced. Rather, the application sends an indication to allow lower layer to bundle the samples to reduce the pose transmission packets 806.

Figure 9A:
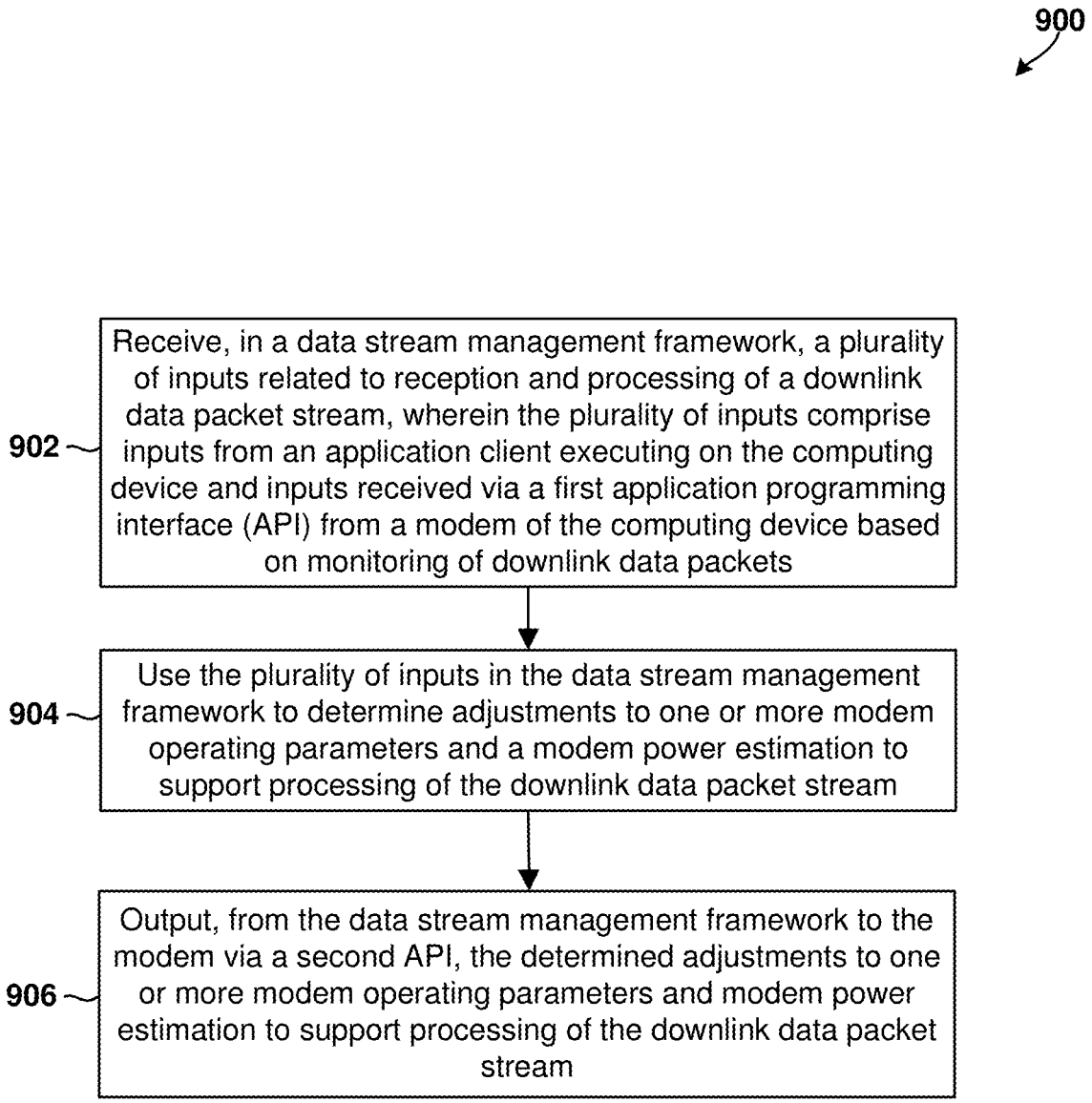
FIGS. 9A and 9B are process flow diagrams illustrating methods of dynamically adjusting a low-latency mode of a modem in a computing device in accordance with some embodiments.
Figure 9B:
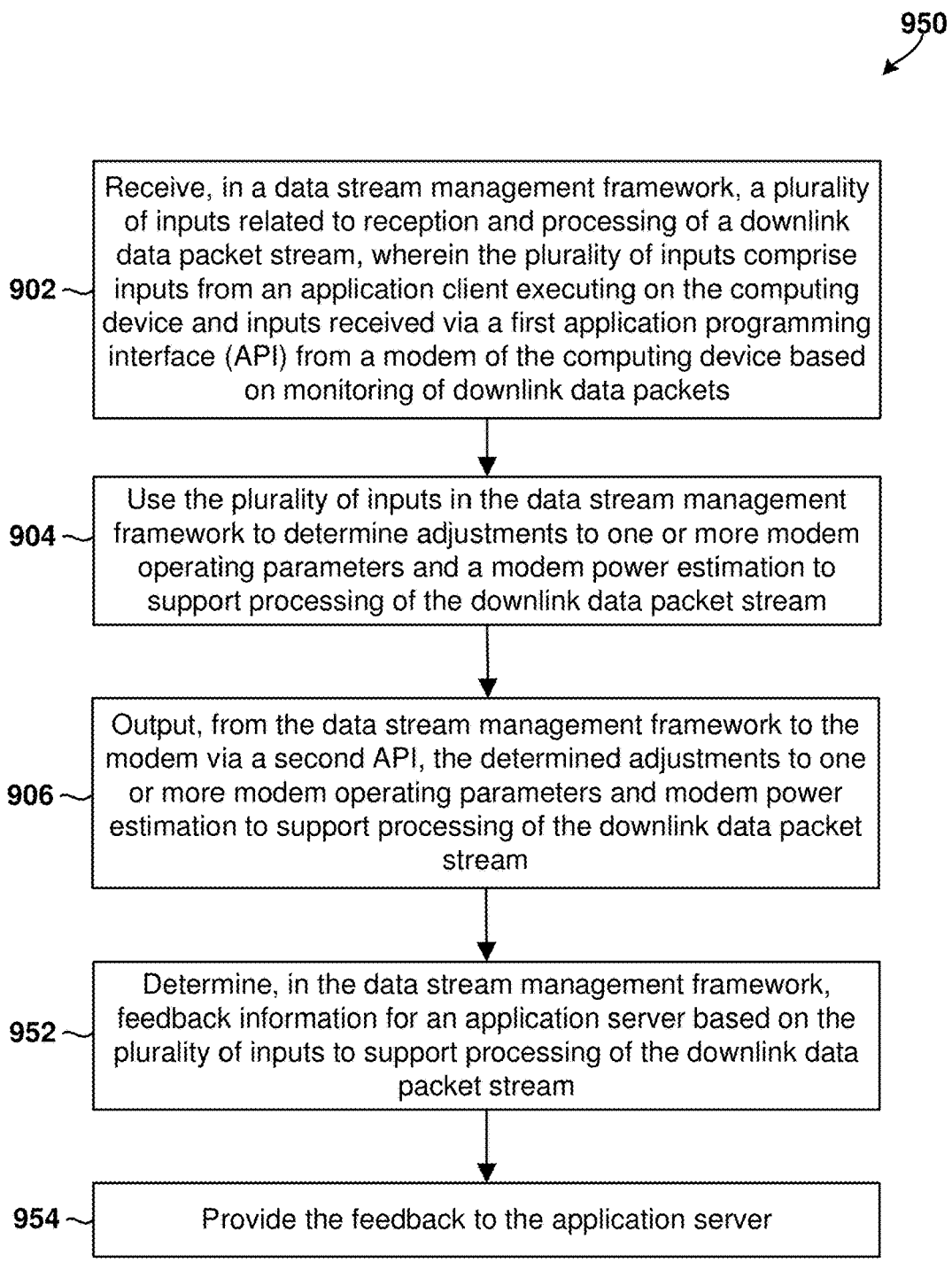

FIGS. 9A and 9B illustrate methods 900, 950 for dynamically adjusting a low-latency mode of a modem in a computing device in accordance with some embodiments. In various embodiments, means for performing the operations in the methods 900, 950 may include a processor, such as any of processors 202, 204, 214, 216, 218, 210, 252, 260 and interconnections 226, 250, 264 illustrated in FIG. 2.

With reference to FIG. 9A, in block 902, the data stream management framework (e.g., framework 362 illustrated in FIGS. 3 and 5, etc.) may receive a plurality of inputs related to reception and processing of a downlink data packet stream. In various embodiments, the data stream management framework may be an application client, middleware, or a software development kit (SDK).

In some embodiments, the plurality of inputs received by the data stream management framework in block 902 may include inputs from an application client executing on the computing device and/or inputs received via a first API from a modem of the computing device based on monitoring of downlink data packets. In some embodiments, the plurality of inputs may include input from an application client inferred event API, such as a modem power estimation, a modem inferred video delay event, a block error rate (BLER), a level of network congestion, a link quality feedback, etc. In some embodiments, the plurality of inputs may include or input from an extended modem feedback API, such as ongoing uplink data rate, ongoing downlink data rate, available uplink data rate, available downlink data rate, a low-latency mode setting, etc.

In some embodiments, the plurality of inputs received by the data stream management framework in block 902 may include a modem inferred video delay event. In various embodiments, the computing device may be configured to determine the modem inferred video delay event based on a packet header inspection modem event, a transport layer modem event or a machine learning event. For example, in some embodiments, the computing system may be configured to determine the modem inferred video delay event based a real-time transport protocol (RTP) layer inspecting a packet header and determining all fragments corresponding to a slice that have not arrived in a received packet burst. In some embodiments, the computing system may be configured to determine the modem inferred video delay event by triggering the modem low-latency mode (LLM) to release stragglers so that decode may progress, using a RTP timestamp of packets as a reference to infer whether any of LLM actions are warranted, comparing RTP timestamps across packets to each other to determine whether a set of packets are late or early resulting in an LLM action, or reading the RTP timestamp of each packet as an absolute RTP timestamp value, determining a local clock offset with respect to source clock, and determining whether a packet is early resulting in an LLM action based on the determined local clock offset and absolute RTP timestamp value.

In some embodiments, the plurality of inputs received by the data stream management framework in block 902 may include a transport layer modem event. The computing system may be configured to determine the transport layer modem event by determining whether there are any pre-programmed time-outs in the transport layer, and implementing a reliable user datagram protocol (RUDP) that achieves reliability with a latency constraint. The RUDP layer may request retransmission of lost packets. In addition, the RUDP layer may be configured to acknowledge all packets, up to a certain sequence number, that have not arrived at the socket in response to detecting a pre-programmed time-out. In some embodiments, the RUDP layer may trigger a low low-latency mode (LLM) prior to the detection of the pre-programmed time-out so that any accumulated packets are released right-away.

In some embodiments, the plurality of inputs received by the data stream management framework in block 902 may include a machine learning event. In some embodiments, the computing system may be configured to determine the machine learning event by implementing a machine learning based algorithm that learns the cadence of packets over time.

In block 904, the data stream management framework may use the plurality of inputs in the data stream management framework to determine adjustments to one or more modem operating parameters and a modem power estimation to support processing of the downlink data packet stream. That is, the data stream management framework may determine adjustments to modem operating parameters and a modem power estimation.

In some embodiments, the data stream management framework may determine the adjustments to the modem operating parameters and/or the modem power estimation based on input from an application client inferred event API and/or input from an extended modem feedback API.

In some embodiments, the input from the extended modem feedback API may include a modem power estimation, a modem inferred video delay event, a block error rate (BLER), a level of network congestion, and/or a link quality feedback.

In some embodiments, the modem power estimation may be determined based on an ongoing uplink data rate, an ongoing downlink data rate, an available uplink data rate, an available downlink data rate, and/or a low-latency mode setting.

In some embodiments, the modem inferred video delay event may be determined in the data stream management framework based on a packet header inspection modem event, a transport layer modem event, and/or a machine learning event. In some embodiments, the modem inferred video delay event may be determined based on a real-time transport protocol (RTP) layer inspecting a packet header and determining all fragments corresponding to a slice that have not arrived in a received packet burst, triggering of a modem low-latency mode (LLM) to release stragglers so that decode may progress, using a RTP timestamp of packets as a reference to infer if any of LLM actions are warranted, comparing RTP timestamps across packets to each other to determine whether a set of packets are late or early resulting in an LLM action, and/or reading the RTP timestamp of each packet as an absolute RTP timestamp value, determining a local clock offset with respect to source clock, and/or determining whether a packet is early resulting in an LLM action based on the determined local clock offset and absolute RTP timestamp value.

In some embodiments, in block 904, the data stream management framework may determine adjustments to at least one or more of a video bitrate, a video frames per second (FPS) setting, or a low latency modem setting based on at least one or more of a power estimate, block error rate (BLER), network congestion, or link quality feedback from the modem. In some embodiments, in block 904, the data stream management framework may determine adjustments to the modem operating parameters and adjustments to the modem power estimation.

In some embodiments, in block 904, the data stream management framework may perform pose rate adaptation such that there is a one-to-one correspondence between pose samples, application pose samples, and pose transmission packets. The data stream management framework may also perform pose rate adaptation such that the pose samples are bundled to generate reduced application pose samples and reduced pose transmission packets and/or so that the pose samples are bundled at a lower layer to reduce pose transmission packets.

In some embodiments, the pose rate adaptation operations in block 904 may include adapting a pose rate based on a measured delay between a user motion and a device display update, an estimate of an amount of motion since collection of a previous pose sample, power consumption feedback received from modem, and/or feedback on device temperature and closeness to tolerable thermal envelope. In some embodiments, the pose rate adaptation operations in block 904 may include reducing the pose rate in response to the processor or data stream management framework detecting a higher delay tolerance, detecting a high network throughput that reduces one or more other latencies to offset pose bundling latency, determining that a user is moving slowly or in a highly predictable trajectory, receiving power consumption feedback received from the modem that indicates that power consumption can be reduced, and/or determining a tolerable thermal envelope. In some embodiments, the pose rate adaptation operations in block 904 may include increasing a pose rate in response to the processor or data stream management framework determining that less delay is required, detecting a consistently high latency, determining that a user is moving fast or in an unpredictable trajectory, receiving power consumption feedback received from modem that indicates no significant increase in power consumption, and/or determining a tolerable thermal envelope.

In block 906, the data stream management framework may output from the data stream management framework to the modem via a second API, the determined adjustments to one or more modem operating parameters and the modem power estimation to support processing of the downlink data packet stream to a modem (e.g., modem 404 illustrated in FIG. 4).

Referring to FIG. 9B, in operation block 902-906, the data stream management framework may perform the operations discuss above with reference to FIG. 9A. In block 952, the data stream management framework may determine feedback information for an application server based on the plurality of inputs to support processing of the downlink data packet stream. The feedback information provided to the application server may include information that includes or is a function of modem feedback, feedback from modem on power consumption, feedback from modem that indicates power consumption can be reduced, feedback from modem on link quality, extended modem feedback, extended modem feedback beyond data rate feedback, available data rates for uplink and downlink, application inferred feedback, rate adaptation feedback, power aware video rate adaptation feedback, device temperature feedback, tolerable thermal envelop feedback, video frames per second (FPS) feedback, bitrate feedback to server, and/or rate adaptation feedback.

In block 954, the data stream management framework may provide the feedback to the application server. For example, in block 954, the data stream management framework may provide to the application server any or all of modem feedback, feedback from modem on power consumption, feedback from modem that indicates power consumption can be reduced, feedback from modem on link quality, extended modem feedback, extended modem feedback beyond data rate feedback, available data rates for uplink and downlink, application inferred feedback, rate adaptation feedback, power aware video rate adaptation feedback, device temperature feedback, tolerable thermal envelop feedback, video frames per second (FPS) feedback, bitrate feedback to server, or rate adaptation feedback.

Figure 10:
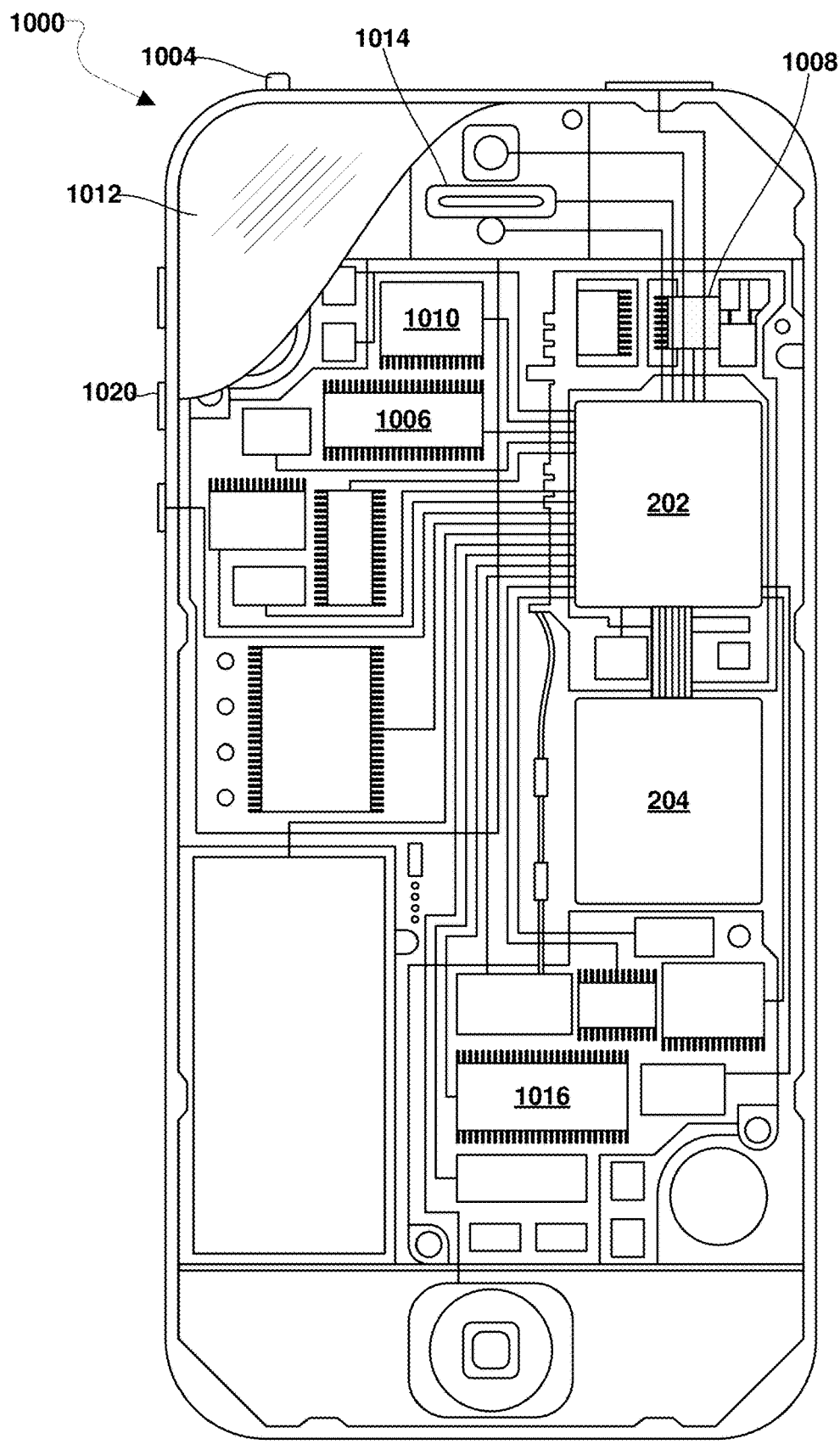
FIG. 10 is a component block diagram of an example client device suitable for implementing various embodiments.

The various embodiments may be implemented on a variety of client devices, an example of which is illustrated in FIG. 10 in the form of a smailphone. A smailphone 1000 may include a first system on chip 202 (e.g., a SOC-CPU) coupled to a system on chip 204 (e.g., a 5G capable SOC). The first and second SOCs 202, 204 may include processors (e.g., application processor, modem processor, graphics processor, etc.), and may be coupled to internal memory 1006, 1016, a display 1012, and to a speaker 1014. Additionally, the client device 1000 may include an antenna 1004 for sending and receiving electromagnetic radiation that may be connected to a wireless data link and/or cellular telephone transceiver 1008 coupled to one or more processors in the first and/or second SOCs 202, 204. Client devices 1000 may also include menu selection buttons or rocker switches 1020 for receiving user inputs.

A client device 1000 may also include a sound encoding/decoding (CODEC) circuit 1010, which digitizes sound received from a microphone into data packets suitable for wireless transmission and decodes received sound data packets to generate analog signals that are provided to the speaker to generate sound. Also, one or more of the processors in the first and second SOCs 202, 204, transceiver 1008 and CODEC circuit 1010 may include a digital signal processor (DSP) circuit (not shown separately).

The processors of a client device 1000 may be any programmable microprocessor, microcomputer or multiple processor chip or chips that can be configured by software instructions (applications) to perform a variety of functions, including the functions of the various implementations described above. Typically, software applications may be stored in the memory 1006, 1016 before they are accessed and loaded into the processor. The processors may include internal memory sufficient to store the application software instructions.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation.

Implementation examples are described in the following paragraphs. While some of the following implementation examples are described in terms of example methods, further example implementations may include: the example methods discussed in the following paragraphs implemented by a computing device comprising a processor configured with processor-executable instructions to perform operations of the example methods; the example methods discussed in the following paragraphs implemented by a computing device including means for performing functions of the example methods; and the example methods discussed in the following paragraphs implemented as a non-transitory processor-readable storage medium having stored thereon processor-executable instructions configured to cause a processor of a computing device to perform the operations of the example methods.

Example 1. A method of dynamically adjusting a low-latency mode of a modem in a client device, including: receiving, in a data stream management framework, a plurality of inputs related to reception and processing of a downlink data packet stream, in which the plurality of inputs includes inputs from an application client executing on the computing device and inputs received via a first API from a modem of the computing device based on monitoring of downlink data packets; using the plurality of inputs in the data stream management framework to determine adjustments to one or more modem operating parameters and a modem power estimation to support processing of the downlink data packet stream; and outputting, from the data stream management framework to the modem via a second API, the determined adjustments to one or more modem operating parameters and the modem power estimation to support processing of the downlink data packet stream.

Example 2. The method of example 1, in which using the plurality of inputs in the data stream management framework to determine adjustments to the one or more modem operating parameters and the modem power estimation to support processing of the downlink data packet stream includes determining adjustments to one or more of a video bitrate, an FPS setting, or a low latency modem setting based on one or more of a power estimate, BLER, network congestion, or link quality feedback from the modem.

Example 3. The method of either example 1 or example 2, in which using the plurality of inputs in the data stream management framework to determine adjustments to the one or more modem operating parameters and the modem power estimation to support processing of the downlink data packet stream includes determining adjustments to the one or more modem operating parameters and adjustments to the modem power estimation based on one or more of an input from an application client inferred event API, or an input from an extended modem feedback API.

Example 4. The method of any of examples 1-3, in which the input from the extended modem feedback API includes one or more of a modem power estimation, a modem inferred video delay event, a block error rate (BLER), a level of network congestion, or a link quality feedback.

Example 5. The method of any of examples 1-4, in which the modem power estimation is determined based on one or more of an ongoing uplink data rate, an ongoing downlink data rate, an available uplink data rate, an available downlink data rate, or a low-latency mode setting.

Example 6. The method of any of examples 1-5, in which the modem inferred video delay event is determined in the data stream management framework based on at least one or more of a packet header inspection modem event, a transport layer modem event, or a machine learning event.

Example 7. The method of any of examples 1-6, further including determining the modem inferred video delay event in the data stream management framework based on one or more of a RTP layer inspecting a packet header and determining all fragments corresponding to a slice that have not arrived in a received packet burst, triggering of a modem LLM to release stragglers so that decode may progress, using a RTP timestamp of packets as a reference to infer if any of LLM actions are warranted, comparing RTP timestamps across packets to each other to determine whether a set of packets are late or early resulting in an LLM action, or reading the RTP timestamp of each packet as an absolute RTP timestamp value, determining a local clock offset with respect to source clock, and determining whether a packet is early resulting in an LLM action based on the determined local clock offset and absolute RTP timestamp value.

Example 8. The method of any of examples 1-7, further including determining the transport layer modem event in the data stream management framework by determining whether there are any pre-programmed time-outs in a transport layer, and implementing a reliable user datagram protocol (RUDP) layer that achieves reliability with a latency constraint in response to determining that there are any pre-programmed time-outs in the transport layer, in which the RUDP layer requests retransmission of lost packets, the RUDP layer may acknowledge all packets (up to a certain sequence number) that have not arrived at a socket in response to detecting a pre-programmed time-out, or the RUDP layer may trigger a LLM prior to detection of the pre-programmed time-out so that any accumulated packets are released right-away.

Example 9. The method of any of examples 1-8, further including determining the machine learning event by implementing, in the data stream management framework, a machine learning based algorithm that learns a cadence of packets over time.

Example 10. The method of any of examples 1-9, further including determining, in the data stream management framework, feedback information for an application server based on the plurality of inputs to support processing of the downlink data packet stream, and providing the feedback information to the application server.

Example 11. The method of any of examples 1-10, further including the feedback information provided to the application server may include information that includes or is a function of one or more of modem feedback, feedback from modem on power consumption, feedback from modem that indicates power consumption can be reduced, feedback from modem on link quality, extended modem feedback, extended modem feedback beyond data rate feedback, available data rates for uplink and downlink, application inferred feedback, rate adaptation feedback, power aware video rate adaptation feedback, device temperature feedback, tolerable thermal envelop feedback, video frames per second (FPS) feedback, bitrate feedback to server, or rate adaptation feedback.

Example 12. The method of any of examples 1-11, in which the data stream management framework is one of an application client executing in a processor of the computing device, middleware executing in a processor of the computing device, or a software development kit (SDK) implemented in a processor of the computing device.

Example 13. The method of any of examples 1-12, further including performing pose rate adaptation such that there is a one-to-one correspondence between pose samples, application pose samples and pose transmission packets, the pose samples are bundled to generate reduced application pose samples and reduced pose transmission packets, or the pose samples are bundled at a lower layer to reduce pose transmission packets.

Example 14. The method of any of examples 1-13, further including adapting a pose rate based on at least one of a measured delay between a user motion and a device display update, an estimate of an amount of motion since collection of a previous pose sample, power consumption feedback received from modem, or feedback on device temperature and closeness to tolerable thermal envelop.

Example 15. The method of any of examples 1-14, further including reducing a pose rate in response to at least one of detecting a higher delay tolerance, detecting a high network throughput that reduces one or more other latencies to offset pose bundling latency, determining that a user is moving slowly or in a highly predictable trajectory, receiving power consumption feedback received from the modem that indicates that power consumption can be reduced, or determining a tolerable thermal envelope.

Example 16. The method of any of examples 1-15, further including increasing a pose rate in response to at least one of determining that less delay is required, detecting a consistently high latency, determining that a user is moving fast or in an unpredictable trajectory, receiving power consumption feedback received from modem that indicates no significant increase in power consumption, or determining a tolerable thermal envelope.

Example 17. The method of any of examples 1-16, further including adapting a pose rate based on a change in a sampling rate of pose information or a change in an amount of pose information being bundled into a single packet for transmission.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The functions described for various embodiments may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A method of dynamically adjusting a low-latency mode of a modem in a computing device, comprising:
   receiving, in a data stream management framework, a plurality of inputs related to reception and processing of a downlink data packet stream, wherein the plurality of inputs comprise inputs from an application client executing on the computing device and inputs received via a first application programming interface (API) from a modem of the computing device based on monitoring of downlink data packets;
   using the plurality of inputs in the data stream management framework to determine adjustments to one or more modem operating parameters and a modem power estimation to support processing of the downlink data packet stream;
   outputting, from the data stream management framework to the modem via a second API, the determined adjustments to one or more modem operating parameters and the modem power estimation to support processing of the downlink data packet stream; and
   performing pose rate adaptation such that:
      there is a one-to-one correspondence between pose samples, application pose samples, and pose transmission packets;
      the pose samples are bundled to generate reduced application pose samples and reduced pose transmission packets; or
      the pose samples are bundled at a lower layer to reduce pose transmission packets.

2. The method of claim 1, wherein using the plurality of inputs in the data stream management framework to determine adjustments to the one or more modem operating parameters and the modem power estimation to support processing of the downlink data packet stream comprises determining adjustments to one or more of a video bitrate, a video frames per second (FPS) setting, or a low latency modem setting based on one or more of a power estimate, block error rate (BLER), network congestion, or link quality feedback from the modem.

3. The method of claim 1, wherein using the plurality of inputs in the data stream management framework to determine adjustments to the modem operating parameters and the modem power estimation to support processing of the downlink data packet stream comprises determining adjustments to the one or more modem operating parameters and adjustments to the modem power estimation based on one or more of:
  an input from an application client inferred event API; or
  an input from an extended modem feedback API.

4. The method of claim 3, wherein the input from the extended modem feedback API includes one or more of:
  a modem power estimation;
  a modem inferred video delay event;
  a block error rate (BLER);
  a level of network congestion; or
  a link quality feedback.

5. The method of claim 4, wherein the modem power estimation is determined based on one or more of:
  an ongoing uplink data rate;
  an ongoing downlink data rate;
  an available uplink data rate;
  an available downlink data rate; or
  a low-latency mode setting.

6. The method of claim 4, wherein the modem inferred video delay event is determined in the data stream management framework based on at least one or more of:
  a packet header inspection modem event:
  a transport layer modem event; or
  a machine learning event.

7. The method of claim 6, further comprising determining the modem inferred video delay event in the data stream management framework based on one or more of:
  a real-time transport protocol (RTP) layer inspecting a packet header and determining all fragments corresponding to a slice that have not arrived in a received packet burst;
  triggering of a modem low-latency mode (LLM) to release stragglers so that decode may progress;
  using a RTP timestamp of packets as a reference to infer if any of LLM actions are warranted;
  comparing RTP timestamps across packets to each other to determine whether a set of packets are late or early resulting in an LLM action; or
  reading the RTP timestamp of each packet as an absolute RTP timestamp value, determining a local clock offset with respect to source clock, and determining whether a packet is early resulting in an LLM action based on the determined local clock offset and absolute RTP timestamp value.

8. The method of claim 6, further comprising determining the transport layer modem event in the data stream management framework by:
  determining whether there are any pre-programmed time-outs in a transport layer; and
  implementing a reliable user datagram protocol (RUDP) layer that achieves reliability with a latency constraint in response to determining that there are any pre-programmed time-outs in the transport layer,
  wherein:
    the RUDP layer requests retransmission of lost packets;
    the RUDP layer acknowledges all packets, up to a certain sequence number, that have not arrived at a socket in response to detecting a pre-programmed time-out; and
    the RUDP layer triggers a low low-latency mode (LLM) prior to detection of the pre-programmed time-out so that any accumulated packets are released right-away.

9. The method of claim 6, further comprising determining the machine learning event by implementing, in the data stream management framework, a machine learning based algorithm that learns a cadence of packets over time.

10. The method of claim 1, further comprising:
  determining, in the data stream management framework, feedback information for an application server based on the plurality of inputs to support processing of the downlink data packet stream; and
  providing the feedback information to the application server.

11. The method of claim 10, wherein feedback information provided to the application server comprises information that includes or is a function of one or more of:
  modem feedback;
  feedback from modem on power consumption;
  feedback from modem that indicates power consumption can be reduced;
  feedback from modem on link quality;
  extended modem feedback;
  extended modem feedback beyond data rate feedback;
  available data rates for uplink and downlink;
  application inferred feedback:
  rate adaptation feedback;
  power aware video rate adaptation feedback;
  device temperature feedback;
  tolerable thermal envelop feedback;
  video frames per second (FPS) feedback;
  bitrate feedback to server; or
  rate adaptation feedback.

12. The method of claim 1, wherein the data stream management framework is one of:
  an application client executing in a processor of the computing device;
  middleware executing in a processor of the computing device; or
  software development kit (SDK) implemented in a processor of the computing device.

13. The method of claim 1, further comprising adapting a pose rate based on at least one of:
  a measured delay between a user motion and a device display update;
  an estimate of an amount of motion since collection of a previous pose sample;
  power consumption feedback received from modem; or
  feedback on device temperature and closeness to tolerable thermal envelop.

14. The method of claim 1, further comprising reducing a pose rate in response to at least one of:
  detecting a higher delay tolerance;
  detecting a high network throughput that reduces one or more other latencies to offset pose bundling latency;
  determining that a user is moving slowly or in a highly predictable trajectory;
  receiving power consumption feedback received from the modem that indicates that power consumption can be reduced; or
  determining a tolerable thermal envelope.

15. The method of claim 1, further comprising increasing a pose rate in response to at least one of:
  determining that less delay is required;
  detecting a consistently high latency;
  determining that a user is moving fast or in an unpredictable trajectory;
  receiving power consumption feedback received from modem that indicates no significant increase in power consumption; or
  determining a tolerable thermal envelope.

16. The method of claim 1, further comprising adapting a pose rate based on:
  a change in a sampling rate of pose information; or
  a change in an amount of pose information being bundled into a single packet for transmission.

17. A computing device, comprising:
  a modem;
  a processor coupled to the modem, wherein the processor is configured with processor-executable instructions to:
    receive in a data stream management framework a plurality of inputs related to reception and processing of a downlink data packet stream, wherein the plurality of inputs comprise inputs from an application client executing on the computing device and inputs received via a first application programming interface (API) from a modem of the computing device based on monitoring of downlink data packets;
    use the plurality of inputs in the data stream management framework to determine adjustments to one or more modem operating parameters and a modem power estimation to support processing of the downlink data packet stream;
    output, to the modem via a second API, the determined adjustments to one or more modem operating parameters and the modem power estimation to support processing of the downlink data packet stream; and
    perform pose rate adaptation such that:
      there is a one-to-one correspondence between pose samples, application pose samples, and pose transmission packets;
      the pose samples are bundled to generate reduced application pose samples and reduced pose transmission packets; or
      the pose samples are bundled at a lower layer to reduce pose transmission packets.

18. The computing device of claim 17, wherein the processor is configured to use the plurality of inputs in the data stream management framework to determine adjustments to the one or more modem operating parameters and the modem power estimation to support processing of the downlink data packet stream by determining adjustments to one or more of a video bitrate, a video frames per second (FPS) setting, or a low latency modem setting based on one or more of a power estimate, block error rate (BLER), network congestion, or link quality feedback from the modem.

19. The computing device of claim 17, wherein the processor is configured to use the plurality of inputs in the data stream management framework to determine adjustments to the modem operating parameters and the modem power estimation to support processing of the downlink data packet stream by determining adjustments to the one or more modem operating parameters and adjustments to the modem power estimation based on one or more of:
  an input from an application client inferred event API; or
  an input from an extended modem feedback API.

20. The computing device of claim 19, wherein the processor is configured so that the input from the extended modem feedback API includes one or more of:
  a modem power estimation;
  a modem inferred video delay event;
  a block error rate (BLER);
  a level of network congestion; or
  a link quality feedback.

21. The computing device of claim 20, wherein the processor is configured so that the modem power estimation is determined based on one or more of:
  an ongoing uplink data rate;
  an ongoing downlink data rate;
  an available uplink data rate;
  an available downlink data rate; or
  a low-latency mode setting.

22. The computing device of claim 20, wherein the processor is configured so that the modem inferred video delay event is determined in a data stream management framework based on at least one or more of:
  a packet header inspection modem event:
  a transport layer modem event; or
  a machine learning event.

23. The computing device of claim 22, wherein the processor is further configured to determine the modem inferred video delay event in the data stream management framework based on one or more of:
  a real-time transport protocol (RTP) layer inspecting a packet header and determining all fragments corresponding to a slice that have not arrived in a received packet burst;
  triggering of a modem low-latency mode (LLM) to release stragglers so that decode may progress;
  using a RTP timestamp of packets as a reference to infer if any of LLM actions are warranted;
  comparing RTP timestamps across packets to each other to determine whether a set of packets are late or early resulting in an LLM action; or
  reading the RTP timestamp of each packet as an absolute RTP timestamp value, determining a local clock offset with respect to source clock, and determining whether a packet is early resulting in an LLM action based on the determined local clock offset and absolute RTP timestamp value.

24. The computing device of claim 22, wherein the processor is further configured to determine the transport layer modem event in the data stream management framework by:
  determining whether there are any pre-programmed time-outs in a transport layer; and
  implementing a reliable user datagram protocol (RUDP) layer that achieves reliability with a latency constraint in response to determining that there are any pre-programmed time-outs in the transport layer,
  wherein:
    the RUDP layer requests retransmission of lost packets;
    the RUDP layer acknowledges all packets, up to a certain sequence number, that have not arrived at a socket in response to detecting a pre-programmed time-out; and
    the RUDP layer triggers a low low-latency mode (LLM) prior to detection of the pre-programmed time-out so that any accumulated packets are released right-away.

25. The computing device of claim 22, wherein the processor is further configured to determine the machine learning event by implementing, in the data stream management framework, a machine learning based algorithm that learns a cadence of packets over time.

26. The computing device of claim 17, wherein the processor is further configured to:
  determine feedback information for an application server based on the plurality of inputs to support processing of the downlink data packet stream; and provide the feedback information to the application server.

27. The computing device of claim 26, wherein the processor is configured so that feedback information provided to the application server comprises information that includes or is a function of one or more of:
   modem feedback;
   feedback from modem on power consumption;
   feedback from modem that indicates power consumption can be reduced;
   feedback from modem on link quality;
   extended modem feedback;
   extended modem feedback beyond data rate feedback;
   available data rates for uplink and downlink;
   application inferred feedback:
   rate adaptation feedback;
   power aware video rate adaptation feedback;
   device temperature feedback;
   tolerable thermal envelop feedback;
   video frames per second (FPS) feedback;
   bitrate feedback to server; or
   rate adaptation feedback.

28. The computing device of claim 17, wherein the processor is further configured to operate a data stream management framework that is one of:
   an application client executing in a processor of the computing device;
   middleware executing in a processor of the computing device; or
   software development kit (SDK) implemented in a processor of the computing device.

29. The computing device of claim 17, wherein the processor is further configured to adapt a pose rate based on at least one of:
   a measured delay between a user motion and a device display update;
   an estimate of an amount of motion since collection of a previous pose sample;
   power consumption feedback received from modem; or
   feedback on device temperature and closeness to tolerable thermal envelop.

30. The computing device of claim 17, wherein the processor is further configured to reduce a pose rate in response to at least one of:
   detecting a higher delay tolerance;
   detecting a high network throughput that reduces one or more other latencies to offset pose bundling latency;
   determining that a user is moving slowly or in a highly predictable trajectory;
   receiving power consumption feedback received from the modem that indicates that power consumption can be reduced; or
   determining a tolerable thermal envelope.

31. The computing device of claim 17, wherein the processor is further configured to increase a pose rate in response to at least one of:
   determining that less delay is required;
   detecting a consistently high latency;
   determining that a user is moving fast or in an unpredictable trajectory;
   receiving power consumption feedback received from modem that indicates no significant increase in power consumption; or
   determining a tolerable thermal envelope.

32. The computing device of claim 17, wherein the processor is further configured to adapt a pose rate based on:
   a change in a sampling rate of pose information; or
   a change in an amount of pose information being bundled into a single packet for transmission.

* * * * *